(12) United States Patent
Takahashi

(10) Patent No.: US 11,360,545 B2
(45) Date of Patent: Jun. 14, 2022

(54) INFORMATION PROCESSING DEVICE, INFORMATION PROCESSING METHOD, AND PROGRAM

(71) Applicant: SONY CORPORATION, Tokyo (JP)

(72) Inventor: Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 847 days.

(21) Appl. No.: 16/076,076

(22) PCT Filed: Jan. 24, 2017

(86) PCT No.: PCT/JP2017/002197
§ 371 (c)(1),
(2) Date: Aug. 7, 2018

(87) PCT Pub. No.: WO2017/168998
PCT Pub. Date: Oct. 5, 2017

(65) Prior Publication Data
US 2021/0191504 A1 Jun. 24, 2021

(30) Foreign Application Priority Data
Mar. 28, 2016 (JP) .............................. JP2016-063386

(51) Int. Cl.
*G06F 3/01* (2006.01)
*G06V 20/40* (2022.01)

(52) U.S. Cl.
CPC .............. *G06F 3/011* (2013.01); *G06V 20/40* (2022.01)

(58) Field of Classification Search
CPC combination set(s) only.
See application file for complete search history.

(56) References Cited

U.S. PATENT DOCUMENTS

| | | | |
|---|---|---|---|
| 8,718,796 B2* | 5/2014 | Cevette | A61N 1/3603 607/148 |
| 9,672,649 B2* | 6/2017 | Yarosh | G02B 27/017 |
| 9,999,835 B2* | 6/2018 | Watson | A61B 3/112 |

(Continued)

FOREIGN PATENT DOCUMENTS

| | | |
|---|---|---|
| JP | 2004-064639 A | 2/2004 |
| JP | 2008-188121 A | 8/2008 |

(Continued)

OTHER PUBLICATIONS

Sato et al., Development of a Head Rotation Interface by Using Hanger Reflex, The 18th IEEE International Symposium on Robot and Human Interactive Communication, Sep. 27-Oct. 2, 2009, pp. 534-538, Toyama, Japan.

(Continued)

*Primary Examiner* — Motilewa Good-Johnson
(74) *Attorney, Agent, or Firm* — Paratus Law Group, PLLC

(57) ABSTRACT

There is provided an information processing device to alleviate motion sickness caused when a video is watched, the information processing device including: a control unit configured to control an operation of a sensation presenting unit that presents a mechanical stimulation or an electric stimulation to a head or a neck of a first user on a basis of information regarding a change in a presentation video presented to the first user via a display unit.

14 Claims, 13 Drawing Sheets

(56) References Cited

U.S. PATENT DOCUMENTS

| | | | |
|---|---|---|---|
| 10,248,202 B2* | 4/2019 | Jung | G06F 3/012 |
| 10,593,088 B2* | 3/2020 | Yarosh | G06F 3/016 |
| 2009/0153474 A1* | 6/2009 | Quennesson | G06F 3/04817 |
| | | | 345/157 |
| 2010/0085462 A1* | 4/2010 | Sako | G09G 5/14 |
| | | | 348/333.01 |
| 2010/0123776 A1* | 5/2010 | Wydeven | H04N 7/183 |
| | | | 348/77 |
| 2011/0044604 A1* | 2/2011 | Brokken | H04N 5/145 |
| | | | 386/239 |
| 2015/0015707 A1* | 1/2015 | Collett | H04N 7/185 |
| | | | 348/148 |
| 2015/0325027 A1* | 11/2015 | Herman | A63F 13/428 |
| | | | 345/633 |
| 2017/0249010 A1* | 8/2017 | Jung | A61N 1/36 |

FOREIGN PATENT DOCUMENTS

| | | |
|---|---|---|
| JP | 2010-197234 A | 9/2010 |
| JP | 2014-164028 A | 9/2014 |
| JP | 2016-024751 A | 2/2016 |
| WO | WO 2010/101641 A2 | 9/2010 |
| WO | WO 2015/122108 A1 | 8/2015 |

OTHER PUBLICATIONS

Ando et al., Theory and Applications of the Vestibular Sensation Interface, Transactions of Information Processing Society of Japan, Mar. 15, 2007, pp. 1326-1335, vol. 48, No. 3, Information Processing Society of Japan.

* cited by examiner

FIG. 6
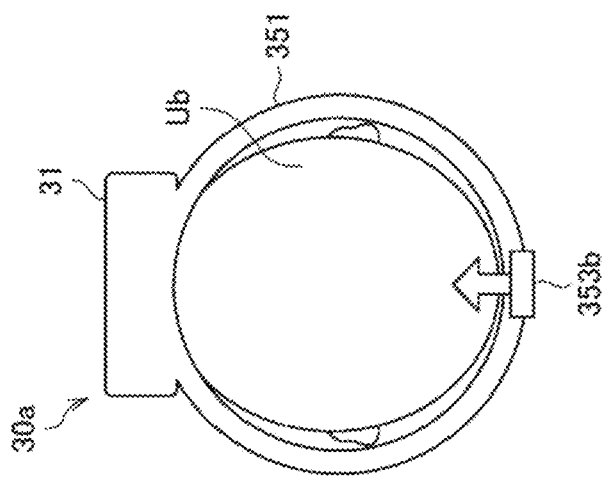
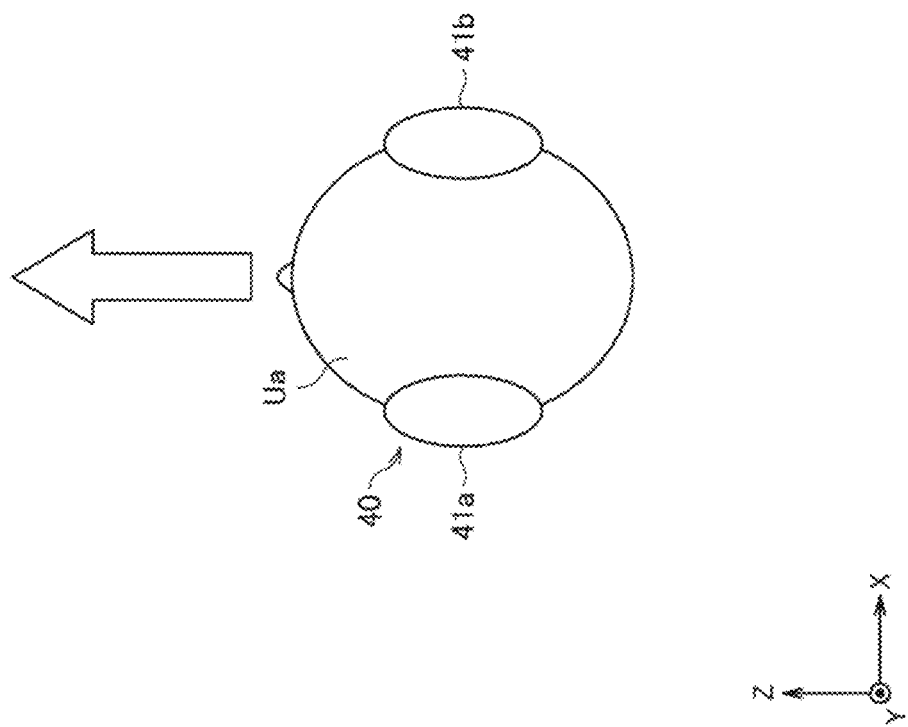

FIG. 7
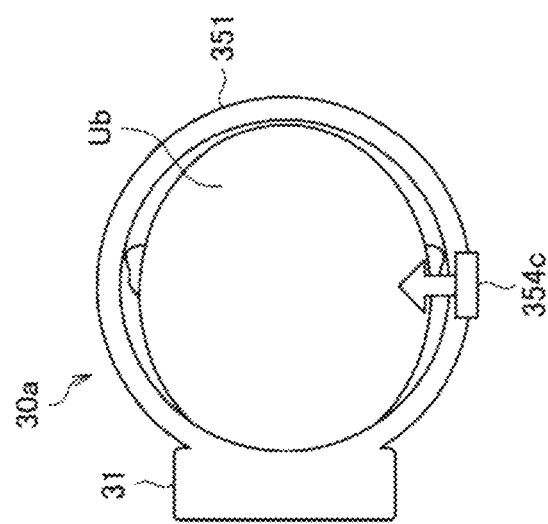
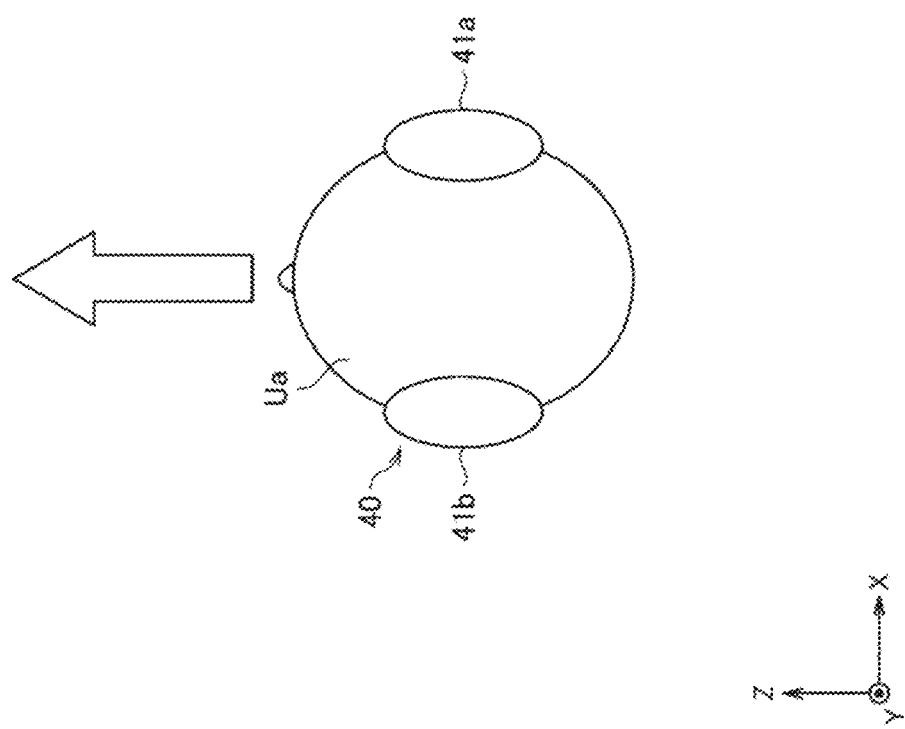

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/002197 (filed on Jan. 24, 2017) under 35 U.S.C. § 371, which claims priority to Japanese Patent Application No. 2016-063386 (filed on Mar. 28, 2016), which are all hereby incorporated by reference in their entirety.

TECHNICAL FIELD

The present disclosure relates to an information processing device, an information processing method, and a program.

BACKGROUND ART

In recent years, structures for providing various experiences such as sharing ranges of view between a user and another user by presenting images of first-person viewpoints have been examined. For example, Patent Literature 1 discloses an example of a technology for enabling a space to be shared between a plurality of users by transmitting a video captured by an imaging device worn on a head to other devices and presenting the video to other users via the other devices.

CITATION LIST

Patent Literature

Patent Literature 1: WO 2015/122108

DISCLOSURE OF INVENTION

Technical Problem

On the other hand, for example, in a situation in which a video from another viewpoint different from a viewpoint of a user is presented to the user, a deviation between a sense of sight and a sense of body, such as a deviation between the presented video and a motion of a head, occurs and the user feels motion sickness in some cases.

Accordingly, the present disclosure proposes an information processing device, an information processing method, and a program capable of alleviating motion sickness caused when a video is watched.

Solution to Problem

According to the present disclosure, there is provided an information processing device including: a control unit configured to control an operation of a sensation presenting unit that presents a mechanical stimulation or an electric stimulation to a head or a neck of a first user on a basis of information regarding a change in a presentation video presented to the first user via a display unit.

In addition, according to the present disclosure, there is provided an information processing method including: by a computer system, controlling an operation of a sensation presenting unit that presents a mechanical stimulation or an electric stimulation to a head or a neck of a first user on a basis of information regarding a change in a presentation video presented to the first user via a display unit.

In addition, according to the present disclosure, there is provided a program causing a computer system to control an operation of a sensation presenting unit that presents a mechanical stimulation or an electric stimulation to a head or a neck of a first user on a basis of information regarding a change in a presentation video presented to the first user via a display unit.

Advantageous Effects of Invention

According to the present disclosure, as described above, an information processing device, an information processing method, and a program capable of alleviating motion sickness caused when a video is watched are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram illustrating an example of force sense presentation to a user by the output device according to the embodiment.

FIG. 7 is an explanatory diagram illustrating another example of the force sense presentation to a user by the output device according to the embodiment.

MODE(S) FOR CARRYING OUT THE INVENTION

Figure 1:
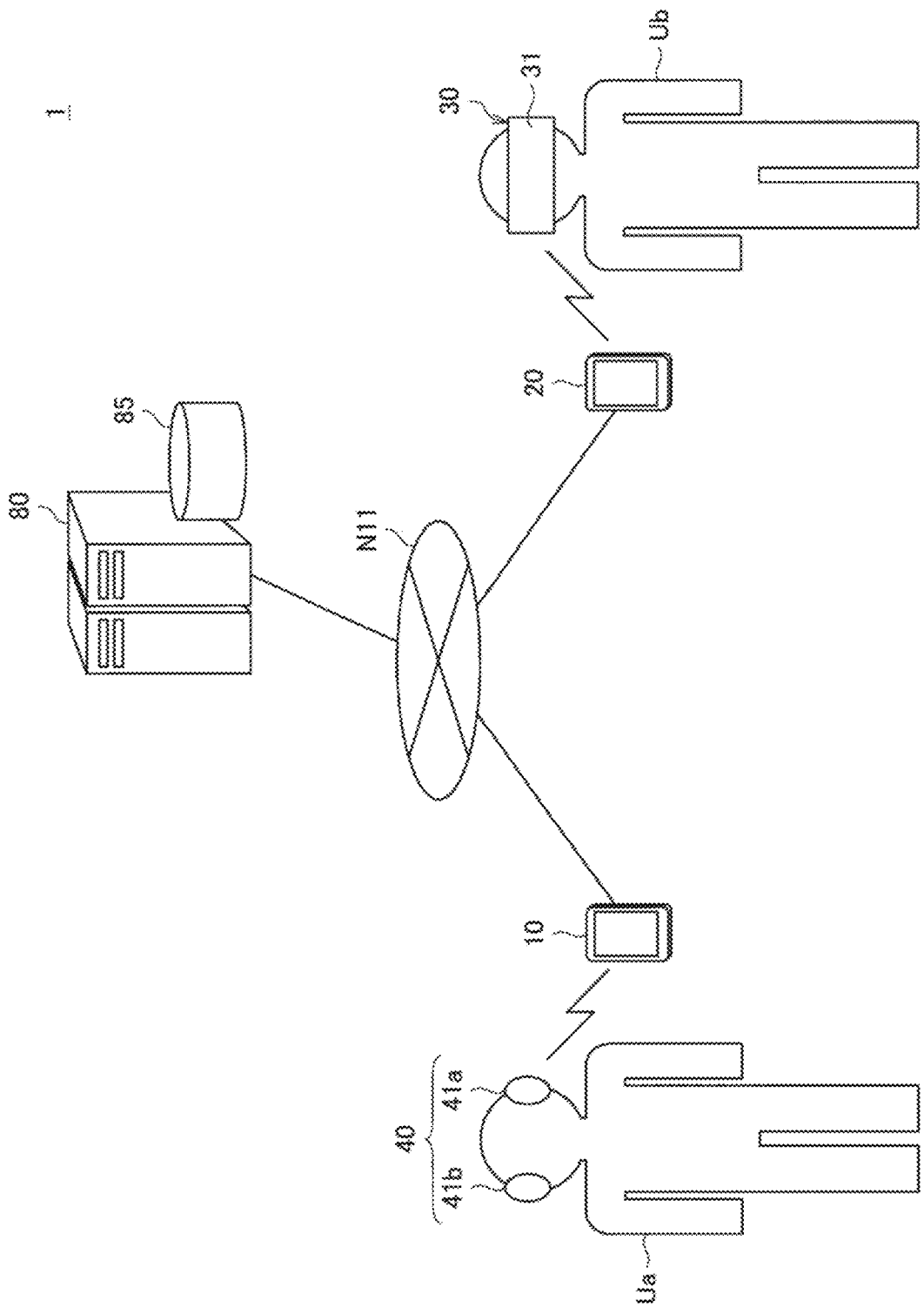
FIG. 1 is an explanatory diagram illustrating an example of an overall configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Overview of system
1.1. Overall configuration of system
1.2. Example of process
2. Examination of video-induced motion sickness
3. Technical features
3.1. Configuration for presenting force sense
3.2. Functional configuration
3.3. Process
4. Modification examples
4.1. Modification Example 1: modification example of configuration for presenting force sense
4.2. Modification Example 2: example of control in which report of information is used
4.3. Modification Example 3: example of application to VR
5. Hardware configuration
6. Conclusion

1. OVERVIEW OF SYSTEM

1.1. Overall Configuration of System

First, an example of an overall configuration of an information processing system according to an embodiment of the present disclosure will be described with reference to FIG. 1. FIG. 1 is an explanatory diagram illustrating an example of an overall configuration of an information processing system according to an embodiment of the present disclosure. As illustrated in FIG. 1, an information processing system 1 according to the embodiment includes an imaging device 40, information processing devices 10 and 20, and an output device 30. In addition, the information processing system 1 may include a content server 80. Each of the information processing devices 10 and 20 and the content server 80 are connected to be able to transmit and receive information via a network N11. Note that the type of network N11 is not particularly limited. As a specific example, the network N11 may be configured with a so-called wireless network such as a network based on the Wi-Fi (registered trademark) standard. In addition, as another example, the network N11 may include the Internet, a dedicated line, a local area network (LAN), a wide area network (WAN), or the like. In addition, the network N11 may include a plurality of networks or a part of the network N11 may be configured as a wired network.

The imaging device 40 includes an imaging unit 41. The imaging unit 41 images an environment image (for example, a moving image or a still image) around a user Ua. In particular, the imaging device 40 according to the embodiment is configured as a so-called head-mounted wearable device and holds imaging units 41 at predetermined positions of the head of the user Ua wearing the imaging device 40. The imaging unit 41 includes, for example, an image sensor and an optical system (for example, a lens or the like) that forms a subject image in the image sensor. Examples of the image sensor include a charge coupled device (CCD), a complementary metal oxide semiconductor (CMOS), and the like.

In addition, the imaging device 40 may include a plurality of imaging units 41 (for example, imaging units 41a and 41b) provided to perform imaging in mutually different directions referring the user Ua as a reference. In this configuration, by combining images captured by the plurality of imaging units 41 through image processing or the like in accordance with angles of view of the plurality of imaging units 41, it is possible to acquire an image in which a range wider than the angle of view of each imaging unit 41 is imaged, such as an omni-directional image. Note that, in this case, a wider-angle lens may be mounted on each of the plurality of imaging units 41 or the plurality of imaging units 41 may be disposed so that an image of each direction in which the user Ua is set as a reference is captured by at least one of the plurality of imaging units 41. Note that in the following description, a case in which an omni-directional image is combined on the basis of the image captured by the plurality of imaging units 41a and 41b will be mainly described to further facilitate understanding of features of the information processing system 1 according to the embodiment, but the present disclosure is not necessarily limited to this mode.

In addition, for example, the imaging device 40 is configured to be able to transmit and receive information to and from the information processing device 10 held by the user Ua via a wireless or wired communication path. In this configuration, the imaging device 40 transmits an image captured by each of the imaging units 41a and 41b to the information processing device 10.

The information processing device 10 acquires an image captured by each of the imaging units 41a and 41b from the imaging device 40. The information processing device 10 combines the images captured by the imaging units 41a and 41b to generate an omni-directional image. Note that, at this time, the information processing device 10 may recognize a change in the position or the orientation of a viewpoint in association with rotation or the like of the head of the user Ua and generate an omni-directional image so that the rotation of the image associated with the change in the position or the orientation of the viewpoint is prevented. Note that an acceleration sensor or an angular velocity sensor is provided in, for example, the imaging device 40 to be able to recognize the change in the position or the orientation of the viewpoint as a change in a position or an attitude of the imaging device 40 on the basis of a detection result of this sensor. In addition, as another example, the change in the position or the orientation of the viewpoint can be recognized by performing an image analysis process on the image captured by each of the imaging units 41a and 41b.

Then, the information processing device 10 transmits the generated omni-directional image to the content server 80 via the network N11.

Note that at least a part of the configuration of the information processing device 10 may be provided in the imaging device 40. For example, a configuration for generating an omni-directional image may be provided in the imaging device 40. In addition, the information processing device 10 and the imaging device 40 may be integrated.

The content server 80 acquires an image (an omni-directional image) based on an imaging result by the imaging device 40 from the information processing device 10 held by the user Ua via the network N11 and delivers the acquired image to an information processing device 20 held by another user (for example, a user Ub). In addition, the content server 80 may temporarily or permanently store an image acquired from the information processing device 10 in, for example, the storage unit 85 and may deliver the image stored in the storage unit 85 to the information processing device 20. In this configuration, an image based on an imaging result by the imaging device 40 can be transmitted synchronously or asynchronously from the information processing device 10 held by the user Ua to the information processing device 20 held by the other user Ub.

The output device 30 is configured as a so-called head-mounted display (HMD) including a display unit 31 such as a display and presents a video to a user (for example, the user Ub) wearing the output device 30 via the display unit 31.

Figure 2:
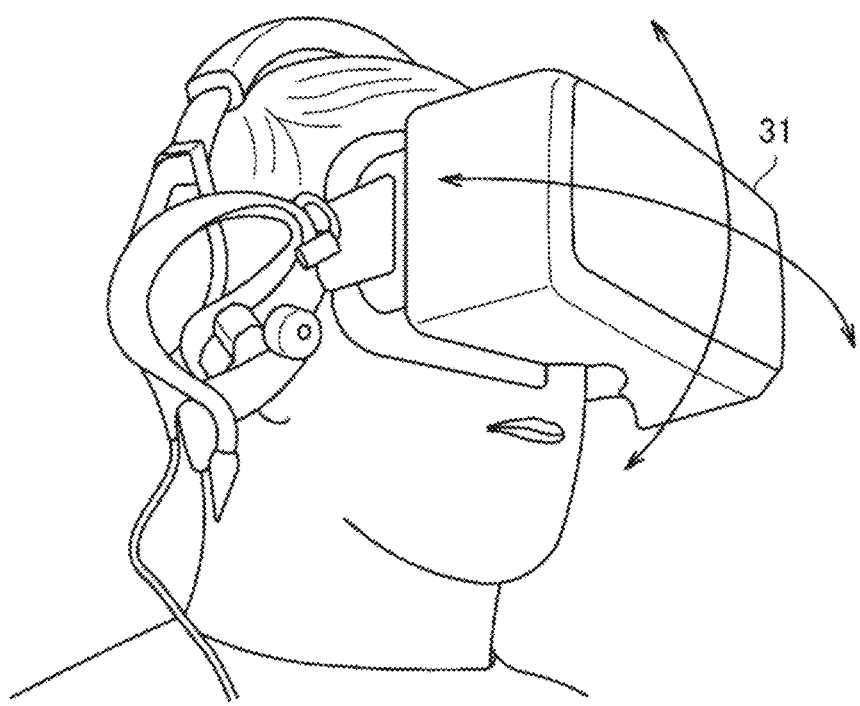
FIG. 2 is an explanatory diagram illustrating an example of an output device applied to the information processing system according to the embodiment.

For example, FIG. 2 is an explanatory diagram illustrating an example of the output device 30 applied to the information processing system according to the embodiment. As illustrated in FIG. 2, the output device 30 is worn on the head of the user so that a display unit (for example, a display panel) that displays an image is held in front of the eyes of the user.

Note that the head-mounted display (HMD) which can be applied as the output device 30 includes a so-called immersive HMD, a see-through HMD, a video see-through HMD, and a retina projection HMD.

In a case in which an immersive HMD is worn on the head or face of a user, the immersive HMD is worn so that the eyes of the user are covered and a display unit such as a display is held in front of the eyes of the user. Therefore, it is difficult for the user wearing the immersive HMD to directly include an external scene (that is, a scene of the real world) in a visual field and only a video displayed on the display unit is included in a range of view. In this configuration, the immersive HMD can provide a sense of immersion to the user watching an image. Note that the output device 30 illustrated in FIG. 2 is equivalent to an immersive HMD.

A see-through HMD holds a virtual image optical system that includes transparent light-guiding units and the like in front of the eyes of a user using a half mirror or a transparent light-guiding plate and displays an image inside the virtual image optical system. Therefore, the user wearing the see-through HMD can include an external scene in a visual field even while the user watches the image displayed inside the virtual image optical system. Note that a specific example of the see-through HMD includes a so-called glasses type wearable device in which a unit equivalent to lenses of glasses is configured as a virtual optical system.

A video see-through HMD is worn over the eyes of a user so that a display unit such as a display is held in front of the eyes of the user, like an immersive HMD. On the other hand, the video see-through HMD includes an imaging unit that images a surrounding scene and causes the display unit to display an image of a scene in a visual line direction of the user imaged by the imaging unit. In this configuration, it is not difficult for the user wearing the video see-through HMD to directly include an external scene in a visual field, and the user can confirm the external scene in accordance with an image displayed on the display unit.

In a retina projection HMD, a projection unit is held in front of the eyes of a user and the image is projected from the projection unit to the eyes of the user so that the image is superimposed on the external scene. More specifically, in the retina projection HMD, an image is directly projected from the projection unit to the retinas of the eyes of the user so that the image is formed on the retinas. In this configuration, even in a case in which a user is shortsighted or far-sighted, the user can watch a clearer video. In addition, the user wearing the retina projection HMD can include an external scene in a visual field even while the user is watching the image projected from the projection unit.

In addition, the output device 30 according to the embodiment may be configured such that, for example, a detection unit such as an acceleration sensor or an angular velocity sensor (a gyro sensor) is provided to detect a motion of the head (an attitude of the head) of the user Ub wearing the output device 30. As a specific example, the output device 30 may detect components in a yaw direction, a pitch direction, and a roll direction as a motion of the head of the user. Note that the output device 30 may notify the information processing device 20 of a detection result of a motion of the head of the user Ub.

The information processing device 20 acquires an image (for example, an omni-directional image) based on an imaging result by the imaging device 40 from the content server 80 via the network N11. Then, the information processing device 20 causes the display unit 31 of the output device 30 to display the acquired image. In this configuration, the user Ub wearing the output device 30 can watch, for example, an environment video around the user Ua wearing the imaging device 40 via the display unit 31 of the output device 30.

In addition, the information processing device 20 may receive a notification of a detection result of a motion of the head (an attitude of the head) of the user Ub from the output device 30. In this configuration, the information processing device 20 may recognize a change in the position or the orientation of a viewpoint of the user Ub (hereinafter collectively referred to as a "change in a viewpoint" in some cases) on the basis of the motion of the head of the user Ub and may present a video in accordance with the recognized change in the viewpoint to the user Ub via the output device 30 (the display unit 31).

Figure 3:
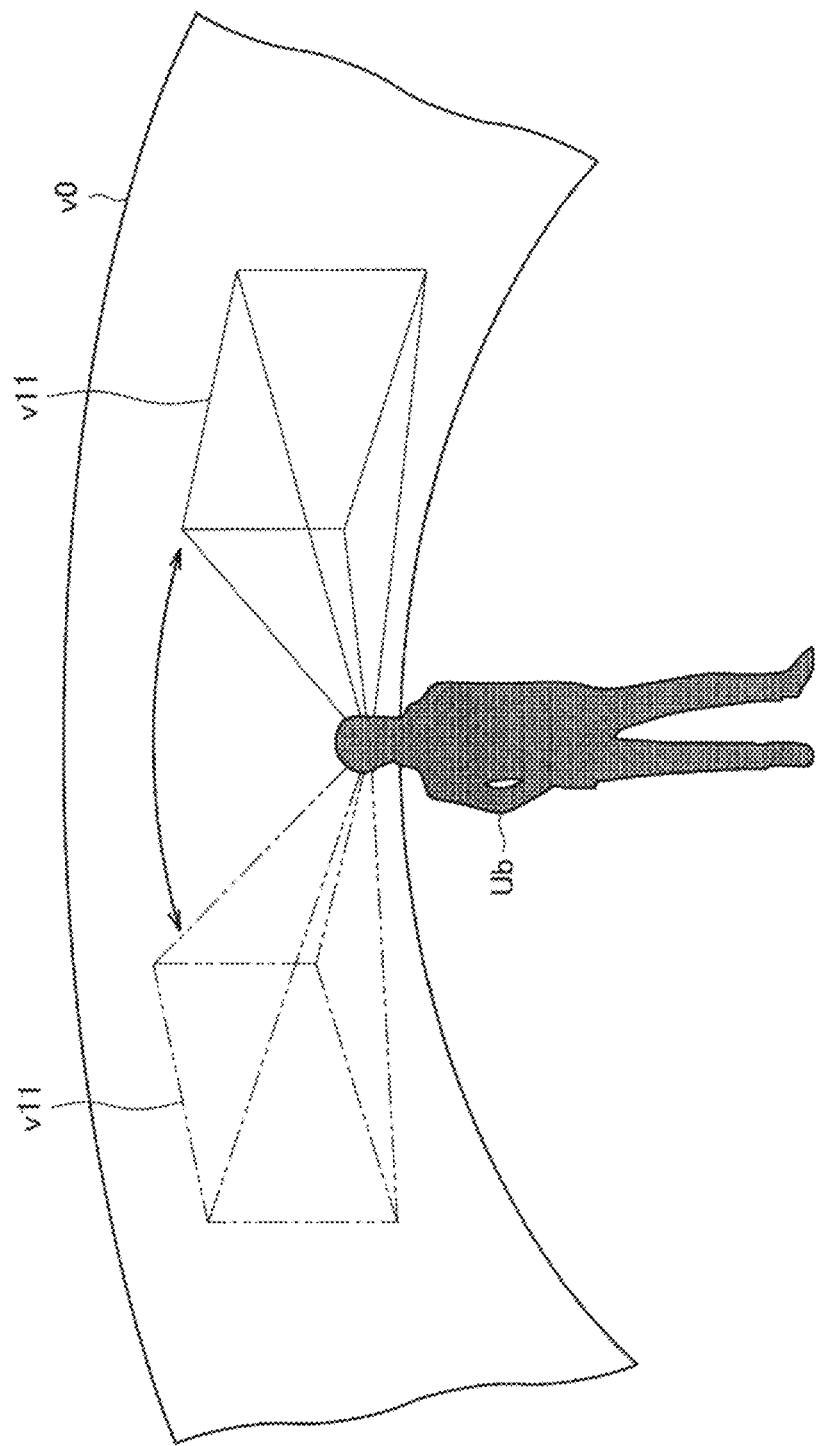
FIG. 3 is an explanatory diagram illustrating an overview of the information processing system according to the embodiment.

For example, FIG. 3 is an explanatory diagram illustrating an overview of the information processing system 1 according to the embodiment and illustrating an example of an operation of presenting a video in accordance with a change in a viewpoint of the user Ub. The example illustrated in FIG. 3 is an example of a case in which a mode referred to via the output device 30 (not illustrated) is simulated while moving a viewpoint so that the user Ub looks around an image v0 developed to be wider than the visual field of the user Ub, like an omni-directional image. Note that the image v0 may be a moving image or may be a still image.

Specifically, the information processing device 20 recognizes a change in a viewpoint of the user by detecting a motion of the head of the user Ub. Then, the information processing device 20 extracts a partial image v11 of a portion in accordance with the position or the orientation of the recognized viewpoint in the image v0 developed to be wider than a visual field of the user Ua on the basis of a preset visual field angle and presents the extracted partial image v11 to the user Ub via the output device 30. That is, the partial image v11 illustrated in FIG. 3 is a schematically illustrated image presented to the display unit 31 of the output device 30.

Note that a visual field angle at which the partial image v11 is extracted may be fixed or may be changed on the basis of a user manipulation or the like. For example, in a case in which a part of the partial image v11 is further expanded to be presented to the user Ub, the information processing device 20 may perform control such that the size of the partial image v11 with respect to the image v0 is relatively smaller by setting the visual field angle to be narrower.

In addition, the method of detecting a motion of the head of the user Ub is not limited to a method based on detection results of various sensors provided in the output device 30. For example, the configuration for detecting a motion of the head of the user Ub may be provided outside of the output device 30. As a specific example, a motion of the head of the user Ub may be detected by causing an imaging device provided outside of the output device 30 to capture an image of the user Ub and analyzing the captured image. In addition, as another example, a motion of the head of the user Ub may be detected by providing any of various sensors such as a so-called optical sensor outside of the output device 30 and causing the sensor to sense the user Ub.

In the above-described configuration, the user Ub can experience a realistic image just as if the user Ub were in that place by referring to the image v0 while looking around and moving his or her viewpoint. Therefore, for example, when an image (an omni-directional image) based on an imaging result by the above-described imaging device 40 is presented as the image v0, the user Ub can obtain an experience as if the user Ub were sharing a space with the user Ua wearing the imaging device 40.

Note that at least part of the configuration of the information processing device 20 may be provided in the output device 30. For example, a configuration in which a partial image in accordance with the position or the orientation of a viewpoint of the user Ub is extracted from the omni-directional image and the extracted partial image is presented to the display unit 31 may be provided in the output device 30. In addition, the information processing device 20 and the output device 30 may be integrated.

Note that, although the example in which the image (the omni-directional image) based on the imaging result by the imaging device 40 is transmitted from the information processing device 10 to the information processing device 20 via the content server 80 has been described in the above-described example, the present disclosure is not necessarily limited to the configuration. For example, an image based on an imaging result by the imaging device 40 may be directly transmitted from the information processing device 10 to the information processing device 20 without passing through the content server 80.

1.2. Example of Process

Figure 4:
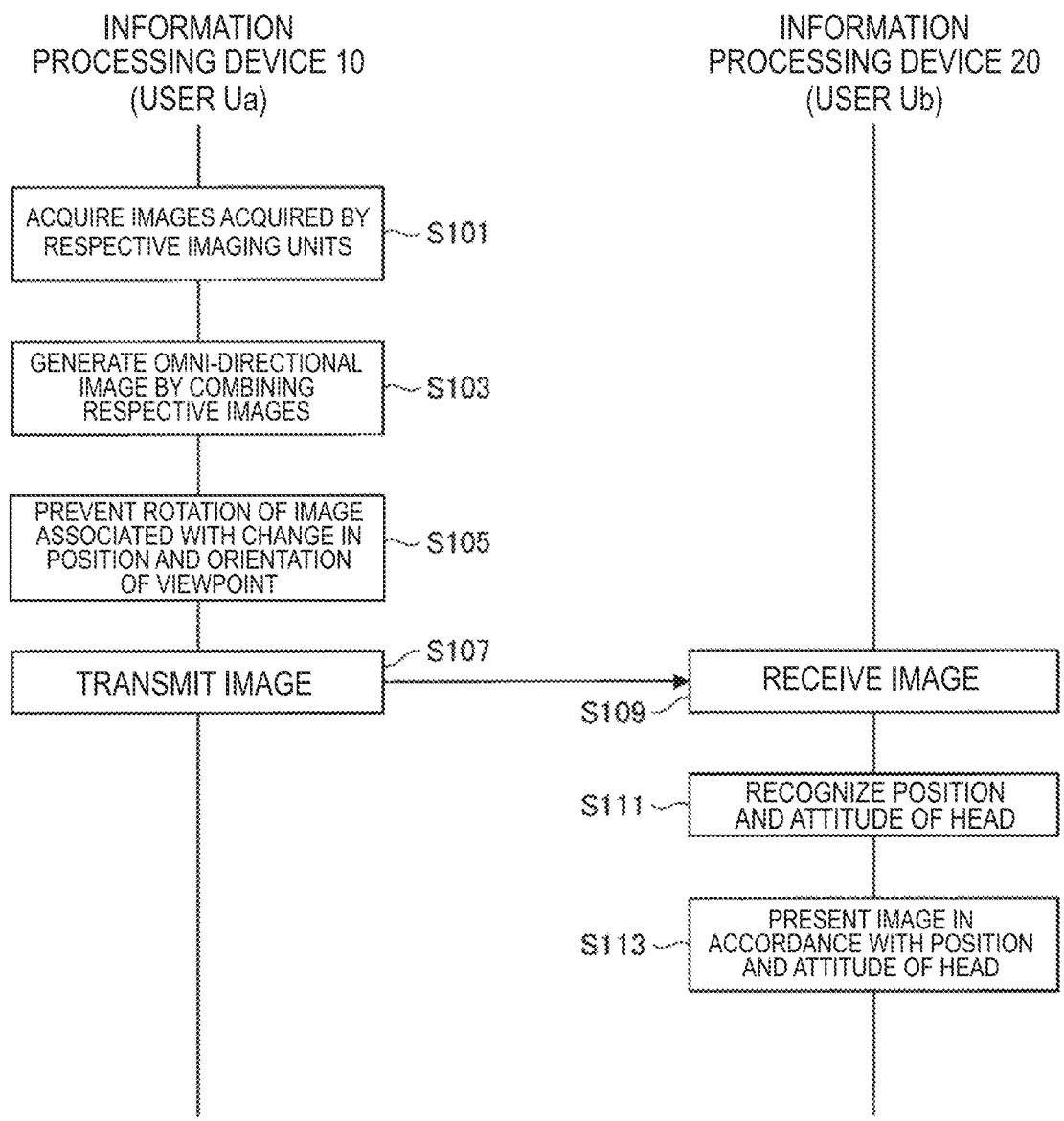
FIG. 4 is an explanatory diagram illustrating an example of a flow of a series of processes of the information processing system according to the embodiment.

Here, an example of a flow of a series of processes of the above-described information processing system 1 will be described with reference to FIG. 4, focusing in particular on operations of the information processing devices 10 and 20. FIG. 4 is an explanatory diagram illustrating an example of a flow of a series of processes of the information processing system 1 according to the embodiment. Note that, in the description, an operation of a case in which the information processing device 10 and the information processing device 20 directly transmit and receive information without passing through the content server 80 will be mainly described to further facilitate understanding of features of the information processing system 1.

As illustrated in FIG. 4, the information processing device 10 held by the user Ua acquires images captured by the respective imaging units 41a and 41b from the imaging device 40 (S101). Then, the information processing device 10 generates an omni-directional image by combining the images captured by the respective imaging units 41a and 41b (S103). Note that, at this time, the information processing device 10 may recognize a change in the position or the orientation of a viewpoint in association with rotation or the like of the head of the user Ua and generate an omni-directional image so that the rotation of the image associated with the change in the position or the orientation of the viewpoint is prevented (S105). Note that, since the method of recognizing the change in the position or the orientation of the viewpoint has been described above, the description thereof will be omitted here. Then, the information processing device 10 transmits the generated omni-directional image to the information processing device 20 held by the user Ub via the network N11 (S107).

The information processing device 20 receives the omni-directional image based on the imaging result by the imaging device 40 from the information processing device 10 via the network N11 (S109). In addition, the information processing device 20 receives a notification related to a detection result of a motion of the head of the user Ub wearing the output device 30 from the output device 30 and recognizes a position and an attitude of the head of the user Ub (in other words, a change in the position or the orientation of the viewpoint of the user Ub) on the basis of the notification (S111). Then, the information processing device 20 extracts a partial image in accordance with the recognized position and attitude of the head of the user Ub from the omni-directional image received from the information processing device 10 and presents the extracted partial image to the user Ub via the display unit 31 of the output device 30 (S13).

In the above-described configuration, the user Ub can obtain an experience as if the user Ub were sharing a space with the user Ua wearing the imaging device 40. The example of the flow of the series of processes of the above-described information processing system 1 has been described above with reference to FIG. 4, focusing in particular on the operations of the information processing devices 10 and 20.

2. EXAMINATION OF VIDEO-INDUCED MOTION SICKNESS

Next, an overview of a mechanism in which video-induced motion sickness occurs will be described, and then a problem of the information processing system according to the embodiment will be outlined.

First, a mechanism by which the human body perceives motion will be described to describe the mechanism by which video-induced motion sickness occurs. A motion of an object can generally be separated into a translational motion and a rotational motion. Inside the human body, rotation or vibration associated with such a motion is perceived as a sense of equilibrium between the vestibule and the semicircular canals. Here, a translational motion is perceived in a case in which a speed of the translation motion is changed without stimulating the vestibule and semicircular canals, that is, in a case in which acceleration is added in a situation in which a user is moving at a constant speed. More specifically, when acceleration is added, an inertial force acts inside the vestibule and this force is perceived by the vestibule.

Subsequently, the mechanism of motion sickness will be described. When a human is actually moving, the human perceives various kinds of information in accordance with various senses such as a sense of sight, a sense of equilibrium, a cutaneous sense, and a sense of body. As a specific example, information regarding a speed and acceleration is perceived from the sense of sight. In addition, information regarding acceleration is perceived from the sense of equilibrium. In addition, muscular contraction or a motion of the user, a force pressing from the outside, or the like is perceived in accordance with a sense of body. The brain recognizes an actual speed and acceleration on the basis of these senses (in other words, each piece of perceived information).

On the other hand, when some of these senses are lost or are not consistent with the others, motion sickness occurs. As a specific example, when a user is watching a video with great acceleration or rotation without actually moving, the human brain is unable to determine whether the user is moving or not, and perceives such a state as motion sickness.

Note that the phenomenon of motion sickness has a considerable tendency to occur particularly in inconsistency of a rotational motion, but also occurs in association with inconsistency of abruptly accelerating or decelerating speeds even in a translational motion in some cases. As a specific example, the human sense of equilibrium perceives large acceleration in a situation of abrupt acceleration. On the other hand, in a case in which only a video is accelerated and movement is not perceived by the sense of equilibrium or the sense of body, motion sickness occurs due to inconsistency between the sense of sight and the sense of equilibrium or the sense of body.

To alleviate motion sickness caused by a video, two approaches are mainly considered. As the first approach, a method of further reducing an expected deviation between a sense of sight and a sense of equilibrium by slowing a motion of a video can be exemplified. More specifically, by further reducing acceleration in an accelerated video, it is possible to alleviate motion sickness.

As the second approach, a method of presenting a sense suitable for a presented video to a user watching the video can be considered. More specifically, by presenting a force to a human tactile sense or force sense, it is possible to compensate for a difference between the sense of body and video expression, and thus it is possible to alleviate motion sickness.

The present disclosure proposes a structure for alleviating motion sickness occurring in association with watching of a video by presenting a force sense suitable for the video to a user watching the video on the basis of the above-described second approach. Hereinafter, the information processing system 1 according to the embodiment will be described in more detail.

3. TECHNICAL FEATURES

Technical features of the information processing system 1 according to the embodiment will be described.

3.1. Configuration for Presenting Force Sense

Figure 5:
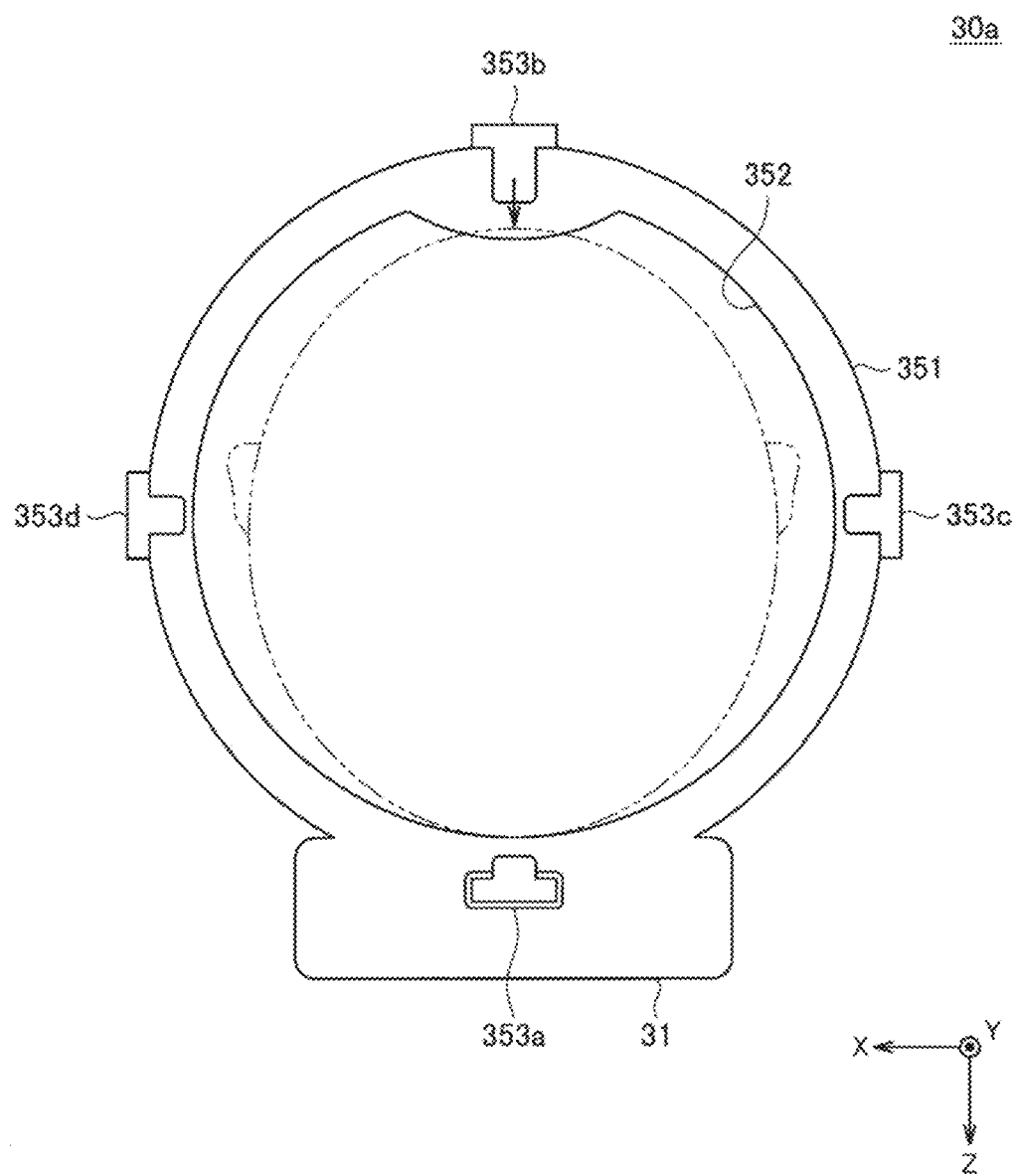
FIG. 5 is an explanatory diagram illustrating an example of a configuration of the output device according to the embodiment.

As described above, in the information processing system 1 according to the embodiment, motion sickness occurring in association with watching of a video is alleviated by presenting a force sense to a user watching the video. Therefore, the output device 30 according to the embodiment has a configuration in which a force sense in accordance with the video is presented to the user wearing the output device. Accordingly, an example of the configuration of the output device 30 according to the embodiment will be described with reference to FIG. 5, focusing in particular on a configuration in which a force sense is presented to the user wearing the output device. FIG. 5 is an explanatory diagram illustrating an example of the configuration of the output device 30 according to the embodiment. Note that FIG. 5 schematically illustrates a schematic configuration in a case in which the output device 30 is viewed in the perpendicular direction and, in particular, the downward direction of the drawing is equivalent to the front of the wear wearing the output device 30. More specifically, in FIG. 5, the upward and downward directions of the drawing indicated as the z direction are equivalent to the front and rear of the user wearing the output device 30 and the right and left directions of the drawing indicated as the x direction are equivalent to the right and left of the user. In addition, the depth direction of the drawing indicated as the y direction is equivalent to the top and bottom of the user. Note that in the following description, in particular, in a case in which the output device 30 illustrated in FIG. 5 is denoted, the output device 30 is referred to as an "output device 30a" in some cases.

As illustrated in FIG. 5, the output device 30a includes a support unit 351 for wearing the output device 30a on the head of the user. Specifically, the support unit 351 is configured to cover the front, rear, right, and left of the head when the output device 30a is worn on the head of the user and holds the display unit 31 in front of the eyes of the user. In the support unit 351, an inner surface coming into contact with the head of the user is formed of an expandable material such as an elastic material or the like. In addition, the support unit 351 supports a plurality of force sense presenting units 353 to be located in mutually different directions around the head on which the output device 30a is worn. Note that the details of the force sense presenting units 353 will be described below. For example, in the example illustrated in FIG. 5, the support unit 351 supports the force sense presenting units 353 at positions corresponding to the front, rear, right, and left of the head on which the output device 30a is worn. Note that in the following description, in a case in which the force sense presenting units 353 corresponding to the front, rear, right, and left are explicitly distinguished and denoted, the force sense presenting units 353 are referred to as force sense presenting units 353a, 353b, 353c, and 353d.

The force sense presenting units 353 are configured to be expanded or contracted by, for example, a solenoid coil, a motor, an air pressure, or the like and are expanded to apply a pressure to an inner surface 352 of the support unit 351 from the outside to the inside of the output device 30a. Thus, in the inner surface 352, expanded portions of the force sense presenting units 353 are partially extended inward to partially compress the head of the user from the outside. In this configuration, the force sense presenting units 353 present a pressure to the head of the user on which the output device 30a is worn.

For example, FIG. 6 is an explanatory diagram illustrating an example of force sense presentation to the user by the output device 30a according to the embodiment. Specifically, FIG. 6 illustrates an example of a case in which an omni-directional image around the user Ua is captured by the imaging device 40 worn on the user Ua and the captured omni-directional image is presented to the user Ub via the output device 30a. Note that the example illustrated in FIG. 6 illustrates a state in which the user Ua starts moving toward the front side while the user Ua is oriented toward the front side (that is, the user Ua starts a translational motion) and the user Ub is oriented in a similar direction as the user Ua (that is, in the front of the user Ua).

In a situation illustrated in FIG. 6, for example, when the user Ua starts moving forward, a video with acceleration toward the front side in association with the forward movement is presented to the user Ub via the output device 30a. At this time, for example, the output device 30a recognizes a change in a position or an attitude of the head of the user Ua (in other words, acceleration applied to the head of the user Ua) on the basis of a detection result by the detection unit such as various sensors provided in the imaging device 40 and presents a force sense to the head of the user Ub in accordance with the recognition result.

Specifically, in a case in which the output device 30a recognizes that the head of the user Ua is moving toward the front side with respect to the user Ub, the output device 30a expands the force sense presenting unit 353b to pressurize the rear of the head of the user Ub and presents a force sense oriented toward the front side to the head. In this configuration, the head of the user Ub is pushed from the rear side to the front side by the output device 30a so that acceleration toward the front side is applied to the head. Thus, acceleration oriented toward the front side is presented so that the acceleration is interlocked with a forward moving video presented to the user Ub. Thus, it is possible to alleviate motion sickness occurring in association with watching of the video.

Note that in the information processing system 1 according to the embodiment, the user Ub can watch a video around the user Ua to look around by appropriately changing an orientation of a viewpoint of the user Ub (in other words, an orientation of the head) irrespective of an orientation of a viewpoint of the user Ua. Therefore, the video presented to the user Ub is changed in accordance with a relative relation between the orientation of the viewpoint of the user Ua and the orientation of the viewpoint of the user Ub. In view of this situation, the output device 30a may control a direction of a force sense to be presented to the user Ub in accordance with the relative relation between the orientation of the viewpoint of the user Ua and the orientation of the viewpoint of the user Ub.

For example, FIG. 7 is an explanatory diagram illustrating another example of the force sense presentation to a user by the output device 30a according to the embodiment. In the example illustrated in FIG. 7, like the example illustrated in FIG. 6, an omni-directional image around the user Ua is captured by the imaging device 40 and the captured omni-directional image is presented to the user Ub via the output device 30a. Note that the example illustrated in FIG. 7 illustrates a state in which the user Ua starts moving toward the front side while the user Ua is oriented toward the front side (that is, the user Ua starts a translational motion) and the user Ub is oriented in the left direction of the user Ua.

In a situation illustrated in FIG. 7, for example, when the user Ua starts moving forward, a video with acceleration from the left side to the right side is presented to the user Ub via the output device 30a in association with the forward movement. At this time, the output device 30a recognizes that the head of the user Ua is moving to the right side with respect to the user Ub.

In this case, the output device 30a expands the force sense presenting unit 353c to pressurize the left of the head of the user Ub and presents a force sense oriented toward the right side to the head. In this configuration, the head of the user Ub is pushed from the left side to the right side by the output device 30a so that acceleration toward the right side is applied to the head. Thus, acceleration oriented toward the right side is presented so that the acceleration is interlocked with a rightward moving video presented to the user Ub. Thus, it is possible to alleviate motion sickness occurring in association with watching of the video.

Note that the plurality of force sense presenting units 353 may be driven in a case in which a force sense oriented in a direction different from the directions in which the force sense presenting units 353 are provided is presented to the head of the user Ub. For example, in a case in which a force sense oriented from a rear right side to a front left side is presented to the head of the user Ub, the force sense presenting unit 353b located on the rear side of the head and the force sense presenting unit 353d located on the right side may be driven for the head.

In addition, there is a case in which a delay is caused with transmission, image processing, or the like until an omni-directional image captured by the imaging device 40 is transmitted to the output device 30a and presented. As described above, motion sickness associated with watching of a video occurs due to inconsistency between a sense of sight and a sense of equilibrium or a sense of body. That is, presentation of a force sense by the output device 30a is preferably interlocked with presentation of a video. Therefore, in a situation in which a delay occurs in presentation of a video in association with transmission, image processing, or the like, the output device 30a may also delay presentation of a force sense in accordance with the delay of the presentation of the video.

In addition, the example illustrated in FIG. 5 has been described as the example of a configuration in which the force sense presenting units 353 are supported at the positions corresponding to the front, rear, right, and left of the head on which the output device 30a is worn. On the other hand, when a force sense oriented in a desired direction can be presented to the head of a user, the positions at which the force sense presenting units 353 are supported are not necessarily limited to the example illustrated in FIG. 5. As a specific example, the force sense presenting units 353 may be supported at positions corresponding to the front right side, the front left side, the rear right side, and the rear left side of the head of a user. In this case, for example, by driving the force sense presenting units 353 supported on the rear right side and the rear left side, it is possible to present a force sense oriented from the rear side to the front side to the head of the user.

The example of the configuration of the output device 30 according to the embodiment has been described above with reference to FIG. 5, focusing in particular on the configuration in which a force sense is presented to a user wearing the output device.

Note that although the case in which a force sense is presented has been mainly described above, for example, motion sickness associated with watching of a video may be alleviated by stimulating another sense such as a tactile sense or a sense of equilibrium of a user. Note that, in the following description, a tactile sense, a force sense, a sense of equilibrium, and the like are collectively referred to as a "tactile force sense." In addition, it is needless to say that a configuration in which a tactile force sense is presented to a user is not limited. For example, a tactile force sense may be presented to a user with a so-called mechanical stimulation provided, such as mechanically applied vibration, a pressure, or the like. In addition, as another example, a tactile force sense may be presented to a user with a so-called electric stimulation provided, for example, by causing a current to flow to an electrode in contact with the user. Note that examples in which a tactile force sense is present to a user will be described also as separate modification examples.

3.2. Functional Configuration

Figure 8:
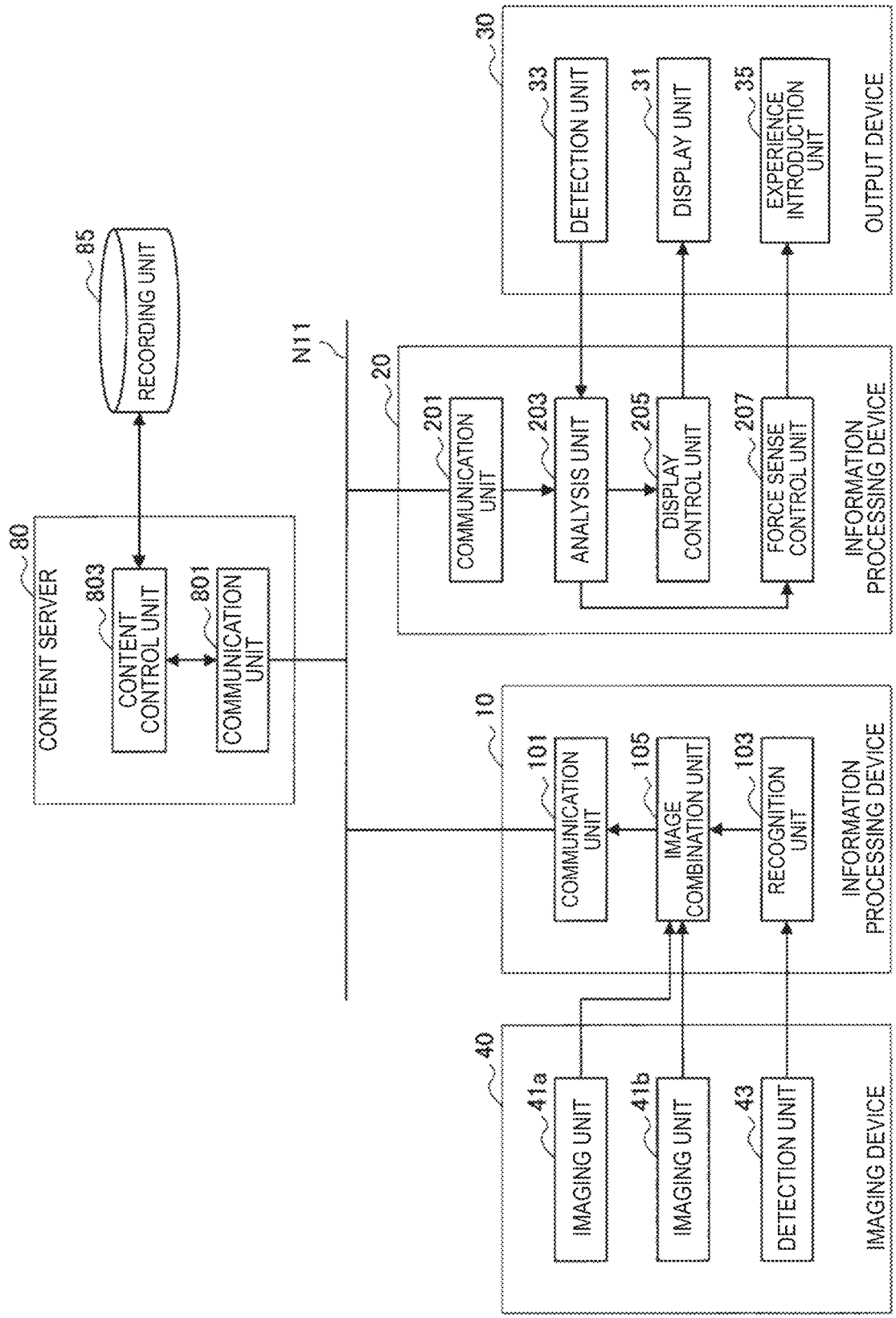
FIG. 8 is a block diagram illustrating an example of a functional configuration of the information processing system according to the embodiment.

Next, an example of a functional configuration of the information processing system 1 according to the embodiment will be described with reference to FIG. 8. FIG. 8 is a block diagram illustrating an example of the functional configuration of the information processing system 1 according to the embodiment.

As described with reference to FIG. 1, the information processing system 1 according to the embodiment includes the imaging device 40, the information processing devices 10 and 20, and the output device 30. In addition, the information processing system 1 may include the content server 80. In addition, each of the information processing devices 10 and 20 and the content server 80 are connected to be able to transmit and receive information via a network N11.

First, the configuration of the imaging device 40 will be focused on. As illustrated in FIG. 8, the imaging device 40 includes a plurality of imaging units 41 (that is, the imaging units 41a and 41b) and a detection unit 43. Note that in the example illustrated in FIG. 8, the case in which the imaging device 40 includes the two imaging units 41a and 41b has been described, but the number of imaging units 41 included in the imaging device 40 is not necessarily limited. That is, the imaging device 40 may include three or more imaging units 41.

Each of the imaging units 41a and 41b captures an image around the imaging device 40 (that is, an image around the user Ua wearing the imaging device) and outputs the captured image to the information processing device 10.

The detection unit 43 includes, for example, an acceleration sensor or an angular velocity sensor (gyro sensor), detects a change in a position or an attitude of the imaging device 40, and outputs a detection result to the information processing device 10.

Next, the configuration of the information processing device 10 will be focused on. The information processing device 10 includes a communication unit 101, a recognition unit 103, and an image combination unit 105.

The communication unit 101 is a communication interface through which each configuration in the information processing device 10 communicates an external device (for example, the content server 80 or the information processing device 20) via the network N11. Note that the configuration of the communication unit 101 can be appropriately changed in accordance with a type of network N11. For example, in a case in which the network N11 is a wireless network, the communication unit 101 may include a baseband (BB) processor, an RF circuit, or the like. Note that in the following description, in a case in which each configuration in the information processing device 10 transmits and receives information to and from an external device via the network N11, the information is assumed to be transmitted and received via the communication unit 101 even in a case in which description is not particularly made.

The recognition unit 103 acquires a detection result of a change in a position or an attitude of the imaging device 40 from the detection unit 43 and recognizes a position or an attitude (in other words, a position or an orientation of a viewpoint) of the head of the user Ua wearing the imaging device 40 on the basis of the acquired detection result. Then, the recognition unit 103 outputs information indicating the recognition result of the position or the attitude of the head of the user Ua to the image combination unit 105.

The image combination unit 105 acquires an image captured by the imaging unit 41 from each of the plurality of imaging units 41. The image combination unit 105 generates an image in which a range wider than an angle of view of each imaging unit 41 is imaged (for example, an omni-directional image) by combining images captured by the plurality of imaging units 41 in accordance with an imaging direction of each imaging unit 41 and the angle of view of the imaging unit 41. Note that in the following description, the image combination unit 105 has generated the omni-directional image to further facilitate understanding of features of the information processing system 1 according to the embodiment. However, the image generated by the image combination unit 105 is not necessarily limited to only an omni-directional image (that is, an image in which a video is presented around 360 degrees on the front, rear, right, and left sides).

Note that the omni-directional image generated by the image combination unit 105 is rotated in accordance with a change in an attitude of the head of the user Ua. Therefore, the image combination unit 105 may prevent the rotation of the omni-directional image in accordance with the change in the attitude of the head of the user Ua through imaging processing. Specifically, the image combination unit 105 acquires information indicating a recognition result of the position or the attitude of the head of the user Ua from the recognition unit 103. The image combination unit 105 may prevent the rotation of the omni-directional image in association with rotation of the head of the user Ua by recognizing the rotation of the head of the user Ua (that is, a change in the orientation of a viewpoint of the user Ua) on the basis of the information indicating the recognition result and performing image processing so that the rotation is cancelled in the generated omni-directional image on the basis of the recognition result of the rotation.

In addition, the image combination unit 105 calculates information indicating an orientation or magnitude of acceleration to be applied to the head of the user Ua as acceleration information on the basis of the information indicating the recognition result of the position or the attitude of the head of the user Ua. Note that, at this time, the image combination unit 105 may calculate the acceleration information in consideration of another component (that is, a component of a translational motion) excluding a component of the above-described rotational motion in a motion of the head of the user Ua.

Then, the image combination unit 105 associates the calculated acceleration information with the generated omni-directional image and transmits the omni-directional image to the content server 80 connected via the network N11.

Note that a process related to acquisition of an image (for example, an omni-directional image) around the user Ua by the above-described imaging device 40 and information processing device 10 or a timing at which each process related to transmission of the image is performed are not particularly limited. As a specific example, the imaging device 40 and the information processing device 10 may capture images around the user Ua in real time, generate an omni-directional image on the basis of the captured images, and transmit the omni-directional image to the content server 80. In addition, as another example, the imaging device 40 and the information processing device 10 may capture images around the user Ua at a desired timing (for example, a timing at which a manipulation is received from the user Ua) and generate an omni-directional image on the basis of the captured images. In this case, the information processing device 10 may transmit the omni-directional image to the content server 80 synchronously with the generation of the omni-directional image or may transmit the omni-directional image to the content server 80 asynchronously with the generation of the omni-directional image.

Next, the configuration of the content server 80 will be focused on. The content server 80 includes a communication unit 801 and a content control unit 803. In addition, the content server 80 may be configured to be able to access the storage unit 85.

The communication unit 801 is a communication interface through which each configuration in the content server 80 communicates with external devices (for example, the information processing devices 10 and 20) via the network NI. Note that the communication unit 801 can have a configuration similar to that of the above-described communication unit 101. In addition, in the following description, in a case in which each configuration in the content server 80 transmits and receives information to and from an external device via the network N11, the information is assumed to be transmitted and received via the communication unit 801 even in a case in which description is not particularly made.

The content control unit 803 acquires an omni-directional image (that is, the image around the user Ua) which is generated by the information processing device 10 and is associated with the acceleration information indicating the orientation or magnitude of acceleration applied to the head of the user Ua, from the information processing device 10 connected via the network N11. In addition, the content control unit 803 delivers the omni-directional image (that is, the omni-directional image associated with the acceleration information) acquired from the information processing device 10 to the other information processing device 20. In addition, the content control unit 803 may temporarily or permanently store the omni-directional image acquired from the information processing device 10 in the storage unit 85 and deliver the omni-directional image stored in the storage unit 85 to the information processing device 20. The storage unit 85 is configured as a so-called storage device or database (DB) and is configured to store various kinds of data such as the above-described omni-directional image or the like. Note that the storage unit 85 may be included in the content server 80. In this configuration, the content control unit 803 can synchronously or asynchronously transmit the omni-directional image acquired from the information processing device 10 to the information processing device 20.

Next, the configuration of the output device 30 will be focused on. The output device 30 includes a display unit 31, a detection unit 33, and a sensation introduction unit 35. Note that the display unit 31 is equivalent to the display unit 31 described with reference to FIGS. 1 and 2. In addition, the sensation introduction unit 35 is configured to present a force sense to the user Ub wearing the output device 30 and is equivalent to the force sense presenting units 353a to 353d of the output device 30a illustrated in FIG. 5.

In addition, the detection unit 33 includes, for example, an acceleration sensor or an angular velocity sensor (a gyro sensor), detects a change in a position or an attitude of the output device 30, and outputs a detection result to the information processing device 20.

Next, the configuration of the information processing device 20 will be focused on. The information processing device 20 includes a communication unit 201, an analysis unit 203, a display control unit 205, and a force sense control unit 207.

The communication unit 201 is a communication interface through which each configuration in the information processing device 20 communicates with an external device (for example, the content server 80 or the information processing device 10) via the network N11. Note that the communication unit 201 can have a configuration similar to that of the above-described communication units 101 and 801. In addition, in the following description, in a case in which each configuration in the information processing device 20 transmits and receives information to and from an external device via the network N11, the information is assumed to be transmitted and received via the communication unit 201 even in a case in which description is not particularly made.

The analysis unit 203 acquires an omni-directional image to be presented to the user Ub from the content server 80. Note that acceleration information indicating an orientation or magnitude of acceleration applied to the head of the user Ua holding the information processing device 10 by the information processing device 10 which is a generation source of an omni-directional image is associated with the omni-directional image. In addition, the analysis unit 203 acquires a detection result of a change in a position or an attitude of the output device 30 from the detection unit 33 and recognizes a position or an attitude (in other words, a position or an orientation of a viewpoint) of the head of the user Ub wearing the output device 30 on the basis of the acquired detection result.

Then, the analysis unit 203 outputs the acquired omni-directional image and information indicating the recognition result of the position or the attitude of the head of the user Ub to the display control unit 205.

In addition, the analysis unit 203 recognizes an orientation or magnitude of acceleration applied to the head of the user Ua on the basis of the acceleration information associated with the omni-directional image. The analysis unit 203 uses the recognition result to recognize a relative change in at least one of the position and the attitude of the head (the viewpoint) of the user Ub (that is, the user wearing the output device 30) with respect to at least one of the position and the attitude of the head (the viewpoint) of the user Ua (that is, the user wearing the imaging device 40). That is, the analysis unit 203 can calculate acceleration information indicating an orientation or magnitude of acceleration applied to the head of the user Ub in a case in which the acceleration applied to the head of the user Ua is simulated for the head of the user Ub.

Then, the analysis unit 203 outputs the acceleration information indicating the orientation or the magnitude of the acceleration applied to the head of the user Ub to the force sense control unit 207.

The display control unit 205 acquires the acquired omni-directional image and information indicating the recognition result of the position or the attitude of the head of the user Ub from the analysis unit 203. The display control unit 205 extracts a partial image in accordance with the position or the attitude (that is, the position or the orientation of the viewpoint) of the head of the user Ub from the acquired omni-directional image on the basis of the information indicating the recognition result on the basis of a preset visual field angle. Then, the display control unit 205 causes the display unit 31 to display the extracted partial image. In this configuration, the information processing device 20 can present the partial image in a direction in accordance with the position or the attitude of the head of the user Ub to the user Ub from the omni-directional image obtained by imaging the images around the user Ua.

The force sense control unit 207 acquires the acceleration information indicating the orientation or the magnitude of the acceleration applied to the head of the user Ub from the analysis unit 203. Then, the force sense control unit 207 presents a force sense to the user Ub by driving the sensation introduction unit 35 in accordance with the orientation or the magnitude of the acceleration indicated by the acceleration information. In this configuration, the information processing device 20 can present the force sense to the user Ub so that the force sense is interlocked with the image presented to the user Ub via the display unit 31.

Note that a timing at which each of the process related to the acquisition of the omni-directional image from the content server 80 by the above-described output device 30 and information processing device 20 and the process related to the presentation of the omni-directional image or the presentation of the force sense is performed is not particularly limited. As a specific example, the output device 30 and the information processing device 20 may synchronously or asynchronously perform the process related to the acquisition of the omni-directional image from the content server 80 and the process related to the presentation of the omni-directional image or the presentation of the force sense.

In addition, when the information processing device 20 can recognize the direction or the magnitude of the force sense presented to the user Ub wearing the output device 30 (in other words, the orientation or the magnitude of the acceleration applied to the head of the user Ub), content of the information associated with the omni-directional image transmitted from the information processing device 10 is not particularly limited. As a specific example, the information processing device 10 may associate information indicating the recognition result of the position or the attitude of the head of the user Ua with the omni-directional image which is a transmission target. In this case, for example, the information processing device 20 may calculate the orientation or the magnitude of the acceleration applied to the head of the user Ua on the basis of the information acquired from the information processing device 10.

In addition, as another example, the information processing device 20 may indirectly recognize a change in a position or an attitude of the imaging device 40 which is an imaging source of the omni-directional image (furthermore, the change in the position or the attitude of the head of the user Ua) by performing image analysis on the omni-directional image. In this case, only the omni-directional image may be transmitted to the information processing device 20.

In addition, a case in which a feeling of the presented force sense is different depending on a user is assumed. Therefore, the information processing device 20 may recognize a user wearing the output device 30 and change magnitude of the force sense (that is, the magnitude of the acceleration) to be presented to the user in accordance with the recognized user. In addition, a user who is a video presentation target may be a plurality of people. In this case, the information processing device 20 may recognize a user who is a wearer for each output device 30 wearing each user and present a force sense to the output device 30 corresponding to strength in accordance with a recognition result. Note that any of various methods can be selectively applied as a method of recognizing a user. Since the method is generally known, the detailed description thereof will be omitted.

In addition, a feeling of a presented force sense is different in accordance with a kind of output device 30 worn on the user or a wearing state of the output device 30. In this case, the information processing device 20 may recognize the kind of output device 30 or the wearing state of the output device 30 and control the magnitude of a force sense to be presented to the user in accordance with a recognition result.

In addition, as another example, a feeling of a presented force sense is different in accordance with a behavior state of the user in some cases. More specifically, in a state in which a user is walking, the user is unlikely to feel a force sense than in a state in which the user stops. Therefore, for example, the information processing device 20 may recognize a behavior of the user by detecting a motion of a predetermined part of the user using an acceleration sensor, an angular velocity sensor, or the like and may control magnitude of the force sense to be presented to the user in accordance with a recognition result.

In addition, the functional configuration of the information processing system 1 according to the embodiment is not necessarily limited to only the example illustrated in FIG. 8 as long as the process of each of the above-described configurations can be realized. For example, as described above, a configuration of a part of the information processing device 10 may be provided on the side of the imaging device 40 or the imaging device 40 and the information processing device 10 may be integrated. Similarly, a configuration of a part of the information processing device 20 may be provided in the output device 30 or the output device 30 and the information processing device 20 may be integrated. In addition, the information processing device 10 may directly transmit the generated omni-directional image to the information processing device 20 without passing through the content server 80.

The example of the functional configuration of the information processing system 1 according to the embodiment has been described above with reference to FIG. 8.

3.3. Process

Figure 9:
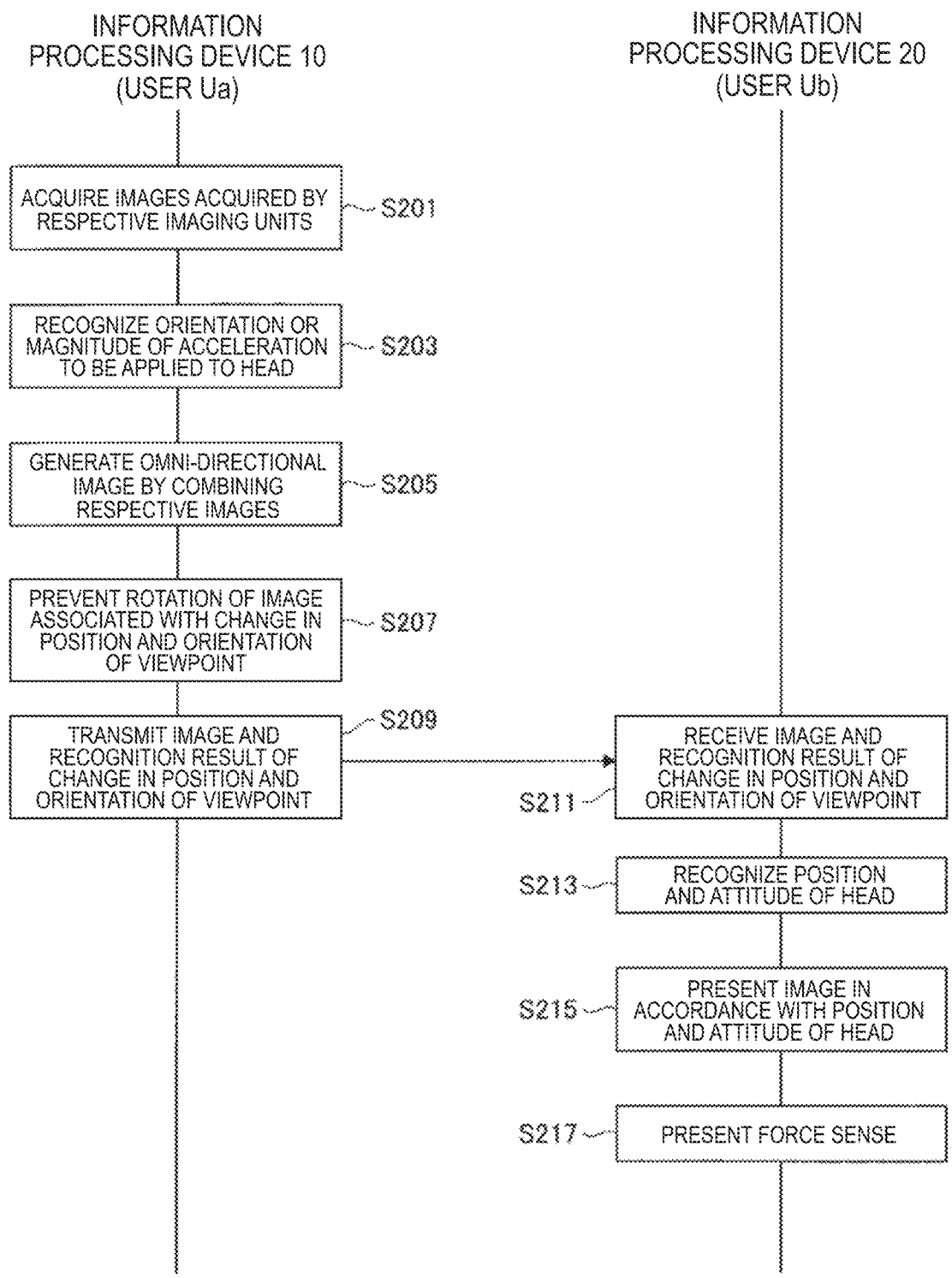
FIG. 9 is an explanatory diagram illustrating an example of a flow of a series of processes of the information processing system according to the embodiment.

Next, in particular, an example of a case in which a force sense is presented to a user wearing the output device 30 so that the force sense is interlocked with a video will be described with reference to FIG. 9 as an example of a flow of a series of processes of the information processing system 1 according to the embodiment. FIG. 9 is an explanatory diagram illustrating an example of a flow of the series of processes of the information processing system 1 according to the embodiment. Note that in the description, an operation of a case in which the information processing device 10 and the information processing device 20 directly transmit and receive information without passing through the content server 80 will be mainly described to further facilitate understanding of features of the information processing system 1, like the example described with reference to FIG. 4.

As illustrated in FIG. 9, the information processing device 10 held by the user Ua acquires images captured by the respective imaging units 41a and 41b from the imaging device 40 (S201). In addition, the information processing device 10 acquires a detection result of the change in the position or the attitude of the imaging device 40 detected by the detection unit 43 from the imaging device 40. Then, the information processing device 10 recognizes the position or the attitude of the head (in other words, the position or the orientation of the viewpoint) of the user Ua wearing the imaging device 40 on the basis of the acquired detection result. In addition, at this time, the information processing device 10 calculates the information indicating the orientation or the magnitude of the acceleration to be applied to the head of the user Ua as acceleration information on the basis of information indicating a recognition result of the position or the attitude of the head of the user Ua (S203).

Subsequently, the information processing device 10 generates an omni-directional image by combining the images captured by the respective imaging units 41a and 41b (S205). In addition, at this time, the information processing device 10 may generate an omni-directional image so that the rotation of the image associated with the rotation of the head (in other words, the change in the position or the orientation of the viewpoint) is prevented on the basis of the recognition result of the position or the attitude of the head of the user Ua (207). Then, the information processing device 10 associates the acceleration information indicating the orientation or the magnitude of the acceleration to be applied to the head of the user Ua with the generated omni-directional image and transmits the omni-directional image to the information processing device 20 held by the user Ub via the network N11 (S209).

The information processing device 20 receives the omni-directional image based on the imaging result by the imaging device 40 from the information processing device 10 via the network N11 (S109). Note that the acceleration information indicating the orientation or the magnitude of the acceleration applied to the head of the user Ua is associated with the omni-directional image. In addition, the information processing device 20 receives a notification related to a detection result of a motion of the head of the user Ub wearing the output device 30 from the output device 30 and recognizes a position and an attitude of the head of the user Ub (in other words, a change in the position or the orientation of the viewpoint of the user Ub) on the basis of the notification (S113). Subsequently, the information processing device 20 extracts a partial image in accordance with the recognized position and attitude of the head of the user Ub from the omni-directional image received from the information processing device 10 and presents the extracted partial image to the user Ub via the display unit 31 of the output device 30 (S215).

In addition, the information processing device 20 recognizes the orientation or the magnitude of the acceleration applied to the head of the user Ua on the basis of the acceleration information associated with the omni-directional image. Subsequently, the information processing device 20 calculates the acceleration information indicating the orientation or the magnitude of the acceleration applied to the head of the user Ub in a case in which the acceleration applied to the head of the user Ua is simulated for the head of the user Ub on the basis of the recognition result. Then, the information processing device 20 presents a force sense to the user Ub wearing the output device 30 by driving the sensation introduction unit 35 of the output device 30 on the basis of the calculated acceleration information. Through the foregoing control, the information processing device 20 can present the force sense to the user Ub so that the force sense is interlocked with the image presented to the user Ub via the display unit 31.

The example of the case in which the force sense is presented to the user wearing the output device 30 so that the force sense is interlocked with the video will be described above in particular with reference to FIG. 9 as the example of the flow of the series of processes of the information processing system 1 according to the embodiment.

4. MODIFICATION EXAMPLES

Next, modification examples of the embodiment will be described.

4.1. Modification Example 1: Modification Example of Configuration for Presenting Force Sense First, an example of the configuration of the output device 30 will be described as Modification Example 1, focusing in particular on a configuration in which a force sense is presented to the user wearing the output device 30.

Figure 10:
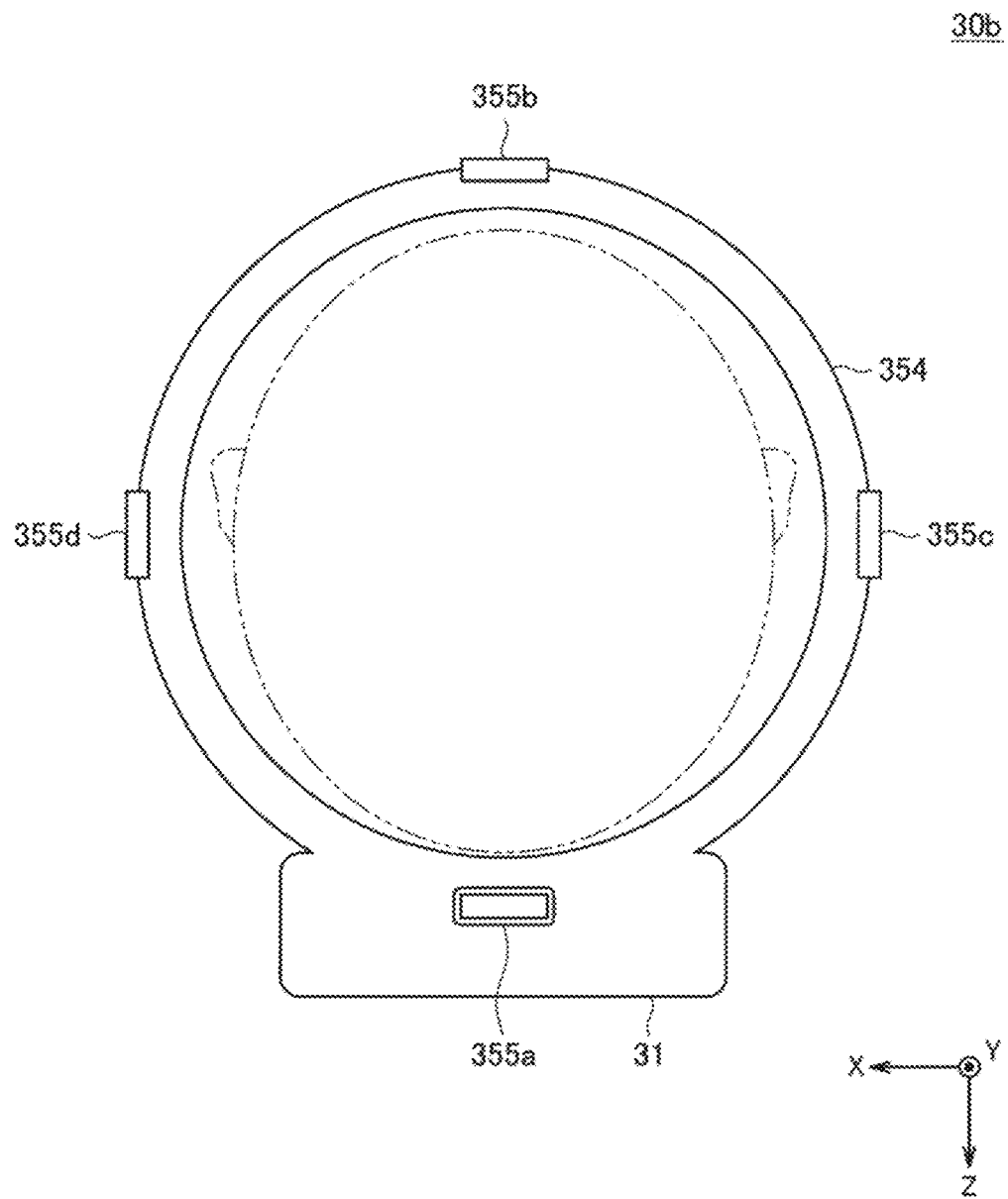
FIG. 10 is an explanatory diagram illustrating an example of a configuration of the output device according to Modification Example 1.

For example, FIG. 10 is an explanatory diagram illustrating an example of the configuration of the output device 30 according to Modification Example 1. Note that like FIG. 5, FIG. 10 schematically illustrates a schematic configuration in a case in which the output device 30 is viewed from above in the perpendicular direction and, in particular, the downward direction of the drawing is equivalent to the front of the user wearing the output device 30. That is, in FIG. 10, the x direction, the y direction, and the z direction correspond to the x direction, the y direction, and the z direction in FIG. 5. In addition, in the following description, in particular, in a case in which the output device 30 illustrated in FIG. 10 is denoted, the output device 30 is referred to as an "output device 30b" in some cases.

As illustrated in FIG. 10, the output device 30b includes a support unit 354 for mounting the output device 30b on the head of the user. Specifically, the support unit 354 is configured to cover the front, rear, right, and left of the head when the output device 30b is worn on the head of the user and holds the display unit 31 in front of the eyes of the user. In addition, the support unit 354 supports a plurality of vibration units 355 to be located in mutually directions around the head on which the output device 30b is worn. Note that the details of the vibration units 355 will be described below. For example, in the example illustrated in FIG. 10, the support unit 354 supports the vibration units 355 at positions corresponding to the front, rear, right, and left of the head on which the output device 30b is worn. Note that in the following description, in a case in which the vibration units 355 corresponding to the front, rear, right, and left are explicitly distinguished and denoted, the vibration units 355 are referred to as vibration units 355a, 355b, 355c, and 355d.

The vibration unit 355 includes a vibrator such as an actuator and vibrates in accordance with a voltage to be applied. In this configuration, by driving at least some of the vibration units 355 among the vibration units 355a to 355d, it is possible to simulate presentation of a force sense to the head of the user in a desired direction. As a specific example, in a case in which a force sense oriented from the rear side to the front side is simulated for the head of the user, the vibration unit 355a located on the front side of the head may be driven. Similarly, in a case in which a force sense oriented from the left side to the right side is simulated for the head of the user, the vibration unit 355d located on the right side of the head may be driven.

Note that the plurality of vibration units 355 may be driven in a case in which presentation of a force sense oriented in a direction different from the directions in which the vibration units 355 are provided is simulated for the head of the user. As a specific example, in a case in which presentation of a force sense oriented from a rear right side to a front left side is simulated for the head of the user, the vibration unit 355a located on the front side and the vibration unit 355c located on the left side may be driven for the head.

In addition, by controlling a combination or a timing of the vibration units 355 to be driven, it is also possible to simulate various force senses for the head of the user. As a specific example, by driving all the vibration units 355, it is possible to simulate presentation of an impact to the head of the user.

In addition, as another example, by controlling a driving timing of the vibration units 355 located in mutually different directions using the head as a reference, it is also possible to simulate presentation of an impact (vibration) as if the impact passes through the head. As a specific example, in a case in which presentation of an impact (vibration) as if the impact passes through from the front side to the rear side is simulated for the head of the user, the vibration unit 355a located on the front side may be driven and the vibration unit 355b located on the rear side may subsequently be driven at a timing in accordance with a propagation speed of the impact at which a body is sensed.

In addition, by controlling a driving timing of each vibration unit 355 such that the plurality of vibration units 355 are each driven in sequence in order in a rotational direction, it is possible to simulate presentation of a force sense as if the head of the user is rotated. As a specific example, in a case in which presentation of a force sense is simulated so that the head of the user is rotated to the right side, the plurality of vibration units 355 may be driven in the order of the vibration units 355a, 355d. 355b, 355c, and 355a in the clockwise direction.

Figure 11:
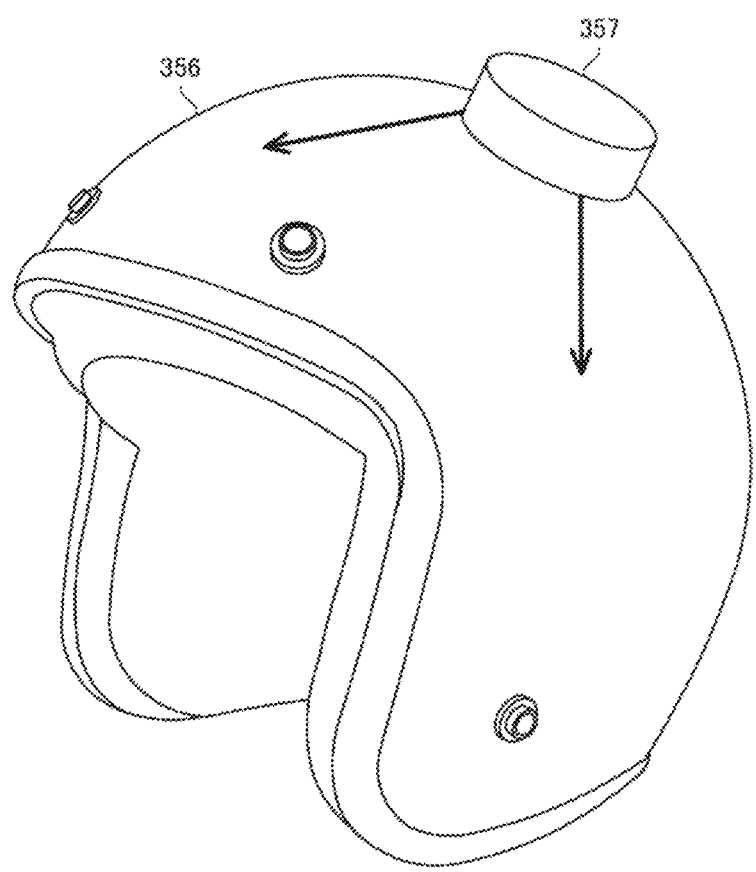
FIG. 11 is an explanatory diagram illustrating another example of the configuration of the output device according to Modification Example 1.

In addition, FIG. 11 is an explanatory diagram illustrating another example of the configuration of the output device 30 according to Modification Example 1. Note that in the following description, in particular, in a case in which the output device 30 illustrated in FIG. 11 is denoted, the output device 30 is referred to as an "output device 30c" in some cases.

The output device 30c includes a mounting unit 356 and a movable weight 357. The mounting unit 356 is configured to mount the output device 30c on the head of the user and supports the movable weight 357 so that the movable weight 357 is physically movable. In this configuration, the output device 30c presents a force sense to the head of the user by relatively moving the movable weight 357 with respect to the head of the user to control the position of the center of gravity.

Note that although not illustrated in FIG. 11, the mounting unit 356 may be configured to hold the display unit 31 in front of the user wearing the output device 30c.

The example of the configuration of the output device 30 has been described above as Modification Example 1 with reference to FIGS. 10 and 11, focusing in particular on the configuration in which the force sense is presented to the user wearing the output device 30. Note that the configuration of the above-described output device 30 is merely exemplary. The configuration is not limited to only the above-described example as long as a force sense can be presented to the user wearing the output device 30.

4.2. Modification Example 2: Example of Control in which Report of Information is Used Next, an example of a structure in which the user Ub wearing an output device more comfortably watches a video captured by the imaging device 40 by reporting information to the user Ua wearing the imaging device 40 will be described as Modification Example 2 with reference to FIG. 1.

First, an example of a case in which feedback for the user Ua is performed in response to a motion of the user Ua wearing the imaging device 40 will be described. Specifically, in a case in which a motion of the user Ua is considerably intense like a situation in which the user Ua performs abrupt acceleration or abrupt deceleration, a video captured by the imaging device 40 may give an unpleasant feeling to another user Ub watching the video in some cases. Accordingly, in the information processing system 1 according to Modification Example 2, by monitoring a motion of the head of the user Ua wearing the imaging device 40, for example, the fact that there is a possibility of an unpleasant feeling giving to the other user Ub watching a video in response to a motion of the user Ua is reported to the user Ua in accordance with a monitoring result.

More specifically, the information processing device 10 held by the user Ua monitors a motion of the head (for example, acceleration applied to the head) of the user Ua on the basis of a detection result of a change in a position or an attitude of the imaging device 40. Then, in a case in which magnitude of the acceleration applied to the head of the user Ua exceeds a threshold, the information processing device 10 reports information to the user Ua via the imaging device 40. In this configuration, for example, the information processing device 10 reports, to the user Ua, the fact that there is a possibility of an unpleasant feeling giving to the other user Ub watching a video. Thus, for example, an advantageous effect in which the user Ua voluntarily slows his or her operation or the like is expected.

Note that the method of reporting information to the user Ua is not particularly limited as long as the information can be reported to the user Ua. As a specific example, the system may be configured so that information is reported to the user Ua by vibration or a sound (sound effect). Note that in this case, a device (for example, the imaging device 40 or the information processing device 10) held by the user Ua may include an actuator presenting vibration, a speaker outputting a sound, or the like as necessary. Of course, information may be reported to the user Ua by displaying report information on a display unit of the device held by the user Ua.

In addition, in a case of a situation in which the user Ua and the user Ub perform communication in real time, information may be reported to the user Ua by controlling the communication. As a specific example, in a situation in which the user Ua and the user Ub perform voice call, the system may perform control to attract attention of the user Ua or the like by performing processing on a voice from the user Ub so that it is hard for the user Ua to hear the voice in a case in which a motion of the user Ua is considerably intense.

In addition, the information processing device 10 held by the user Ua may control report of the information to the user Ua in accordance to an attribute of the other user Ub watching a video captured by the imaging device 40 worn on the user Ua.

As a specific example, the information processing device 10 may perform control such that a frequency at which information is reported to the user Ua increases in a case in which the user Ub watching a video easily feels motion sickness. In this case, for example, the information processing device 10 may set a threshold for determining whether to report information to be lower in accordance with an acceleration value applied to the head of the user Ua. Conversely, in a case in which the user Ub watching a video is unlikely to feel motion sickness, the information processing device 10 may perform control such that a frequency at which information is reported to the user Ua decreases. In this case, for example, the information processing device 10 may set the threshold for determining whether to report information to be higher in accordance with the acceleration value applied to the head of the user Ua.

Note that the method in which the information processing device 10 determines whether the user Ub easily feels motion sickness is not particularly limited. As a specific example, the information processing device 10 may recognize whether the user Ub easily feels motion sickness by acquiring biological information of the user Ub from a biological sensor worn on the user Ub. In addition, as another example, for example, there may be provided a structure in which the user Ub notifies the information processing device 10 that the user Ub perceives motion sickness via the information processing device 20 held by the user Ub in a case in which the user Ub perceives the motion sickness. In this case, the information processing device 10 may detect a timing at which the notification is received or magnitude of a deviation of a video at the timing and may set the threshold for determining whether to report information to the user Ua in accordance with the detection result.

In addition, in the above-described example, the case in which only the user Ub watches the video around the user Ua captured by the imaging device 40 has been mainly described. On the other hand, a situation in which a plurality of user watch the video can also be assumed. In this case, for example, the information processing device 10 may set the threshold for determining whether to report information to the user Ua wearing the imaging device 40 in accordance with a user who is most likely to feel motion sickness among the plurality of users watching the video.

In addition, the information processing device 10 may control a frequency at which information is reported to the user Ua wearing the imaging device 40 in accordance with preference of a user watching a video. As a specific example, the information processing device 10 may perform control such that the frequency at which information is reported to the user Ua increases in a case in which the user Ub watching a video has a tendency to carefully see a video of each spot. A method of recognizing a preference of the user Ub watching a video is not particularly limited. As a specific example, the preference of the user Ub may be recognized on the basis of a monitoring result of a watching situation of a video in the user Ub.

Next, an example of a case in which report information in accordance with a situation of the user Ub is fed back to the user Ua on the assumption of a situation in which the user Ub wearing the output device 30 watches a video captured by the imaging device 40 in real time will be described. A video which can be watched by the user Ub wearing the output device 30 is limited in accordance with the position of the user Ua wearing the imaging device 40 which is an imaging source of the video in some cases. The user Ua may be prompted to move by reporting report information to the user Ua in accordance with an intention of the user Ub on the assumption of such a situation.

For example, the system may detect a motion (in other words, a change in a viewpoint) of the head of the user Ub and report the report information in accordance with a detection result to the user Ua. Specifically, the information processing device 20 held by the user Ub may recognize a motion of the head of the user Ub wearing the output device 30 on the basis of a detection result of a change in a position or an attitude of the output device 30 and may transmit information indicating a recognition result to the information processing device 10 held by the user Ua. The information processing device 10 may recognize a motion of the head of the user Ub on the basis of the information transmitted from the information processing device 20 and may report information to the user Ua, for example, in a case in which the recognition result satisfies a predetermined condition, such as the fact that the head of the user Ub is oriented in a different direction from the head of the user Ua.

Note that the method of reporting information to the user Ua is not particularly limited. For example, by allowing the imaging device 40 wearing the user Ua to have a configuration in which a force sense is presented, like the output device 30, information may be reported to the user Ua by presenting a force sense. More specifically, the information processing device 10 may recognize an orientation or magnitude of acceleration applied to the head of the user Ub on the basis of information acquired from the information processing device 20 and may control an operation (in particular, an operation of a configuration in which a force sense is presented) of the imaging device 40 such that similar acceleration is applied to the head of the user Ua. Note that it is needless to say that the configuration in which a force sense is presented is not particularly limited. As a specific example, a force sense may be directly presented to the head of the user Ua on the basis of a configuration similar to that of the output device 30a illustrated in FIG. 5. As another example, presentation of a force sense to the head of the user Ua may be simulated by vibration on the basis of a configuration similar to that of the output device 30b illustrated in FIG. 10.

In addition, information may be reported to the user Ua by a sound. For example, in a situation in which the user Ua and the user Ub perform voice call, the information processing device 10 may control a method of presenting a voice of the user Ub to the user Ua in accordance with a motion of the head of the user Ub. As a more specific example, the information processing device 10 may control an operation of a sound device (for example, a speaker or the like provided in the imaging device 40) of a device held by the user Ua such that a state in which a voice of the user Ub arrives in a direction in accordance with a motion of the head of the user Ub is simulated. Of course, information may be reported to the user Ua by displaying report information to a display unit of the device held by the user Ua.

The example of the structure in which the user Ub wearing an output device more comfortably watches a video captured by the imaging device 40 by reporting information to the user Ua wearing the imaging device 40 has been described above as Modification Example 2 with reference to FIG. 1.

4.3. Modification Example 3: Example of Application to VR

Subsequently, an example of a case in which the information processing system 1 according to the embodiment is applied to virtual reality (VR) will be described as Modification Example 3.

As described above, in the information processing system 1 according to the embodiment, a video from another viewpoint different form the viewpoint of the user Ub is presented to the user Ub wearing the output device 30 and a force sense is presented so that the force sense is interlocked with the presentation of the video. In this configuration, the information processing system 1 according to the embodiment alleviates motion sickness occurring in association with watching of a video.

On the other hand, the video presented to the user Ub is not limited to only to an image obtained by imaging a real space, like the above-described embodiment. For example, the information processing system 1 according to the embodiment may present a video in a virtual space as an image of a first-person viewpoint to the user Ub. In this way, even in a case in which a video in a virtual space is presented to the user Ub, the user Ub perceives motion sickness in some cases in a situation in which the video with abrupt acceleration or deceleration. Therefore, the information processing system 1 according to the embodiment may alleviate motion sickness occurring in association with watching of a video, for example, by presenting the video in a virtual space to the user Ub wearing the output device 30 and presenting a force sense to the user Ub so that the force sense is interlocked with the presentation of the video.

In addition, in a situation in which a video in a virtual space is presented, a case in which the video in the virtual space can be watched in a different mode from a case in which a user views a real space with his or her naked eyes is also assumed. Even in this case, a force sense may be presented to a user in accordance with a situation. As a specific example, a situation in which a magnification ratio of a video watched in response to zoom-in and a zoom-out or the like is controlled can be exemplified.

Figure 12:
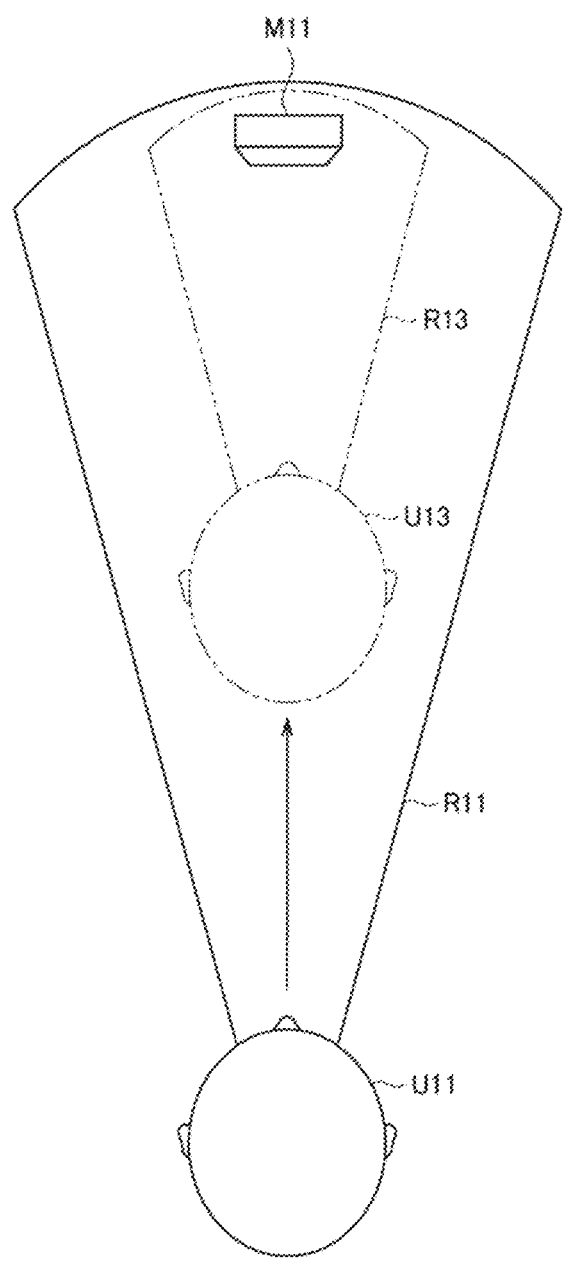
FIG. 12 is an explanatory diagram illustrating an overview of the information processing system 1 according to Modification Example 3.

For example, FIG. 12 is an explanatory diagram illustrating an overview of the information processing system 1 according to Modification Example 3 and simulatively illustrates an example of a case in which a virtual object M11 is expanded and displayed in a situation in which a user views the virtual object M11 in a virtual space. In FIG. 12, reference numeral U11 schematically denotes the position of a viewpoint of the user set in the virtual space. In addition, reference numeral R11 schematically denotes a range (that is, a visual field) which can be watched from the viewpoint set at the position U11.

Here, in a situation in which the user views the virtual object M11 from the viewpoint set at the position U11 in the virtual space, the virtual object M11 is assume to be expanded and displayed. In this case, control is performed such that a range of the virtual object M11 occupying the visual field is wider. Therefore, the user can view a video in which the viewpoint set at the position U11 in the virtual space moves toward the virtual object M11 (translational motion). For example, reference numeral U13 schematically denotes a position of a pseudo-viewpoint in a case in which the virtual object M11 is expanded and displayed. In addition, reference numeral R13 schematically denotes a visual field from the viewpoint U13 set at the position U13.

Accordingly, in a case in which the user controls a magnification ratio, the information processing system 1 may calculate movement of a pseudo-viewpoint associated with expansion of an image and presents a force sense in accordance with the movement of the viewpoint. For example, in the example illustrated in FIG. 12, the information processing system 1 recognizes that the viewpoint set at the position U11 is moved to the position U13 in a pseudo-manner in association with the expansion and display of the virtual object M11. Then, the information processing system 1 may calculate an orientation or magnitude of acceleration to be applied in a pseudo-manner to the head of a user in a virtual space in association with the movement of the viewpoint from the position U11 to the position U13 and may present a force sense to the user via the output device 30 in accordance with a calculation result.

Note that in the example illustrated in FIG. 12, the case in which a manipulation equivalent to so-called zoom-in is performed has been mainly described. However, even in a case in which a manipulation equivalent to zoom-out is performed, acceleration may be calculated on the basis of a similar idea and a force sense may be presented on the basis of a calculation result. Specifically, in a situation in which the virtual object M11 is contracted and displayed, a user views a video moving in a direction separated from the virtual object M11 (that is, the rear side). Therefore, in this case, the information processing system 1 may present a force sense to the user via the output device 30 so that acceleration is applied to the head of the user toward the rear side.

Note that the above-described example is merely exemplary and the present disclosure is not limited to only the above-described example. For example, in a situation in which a video with acceleration or deceleration is presented, a force sense can be presented so that the force sense is interlocked with the video by calculating movement of a pseudo-viewpoint, as described above, even in a case in which a viewpoint is not actually moved in a virtual space.

The example of the case in which the information processing system 1 according to the embodiment is applied to VR has been described above as Modification Example 3.

5. HARDWARE CONFIGURATION

Figure 13:
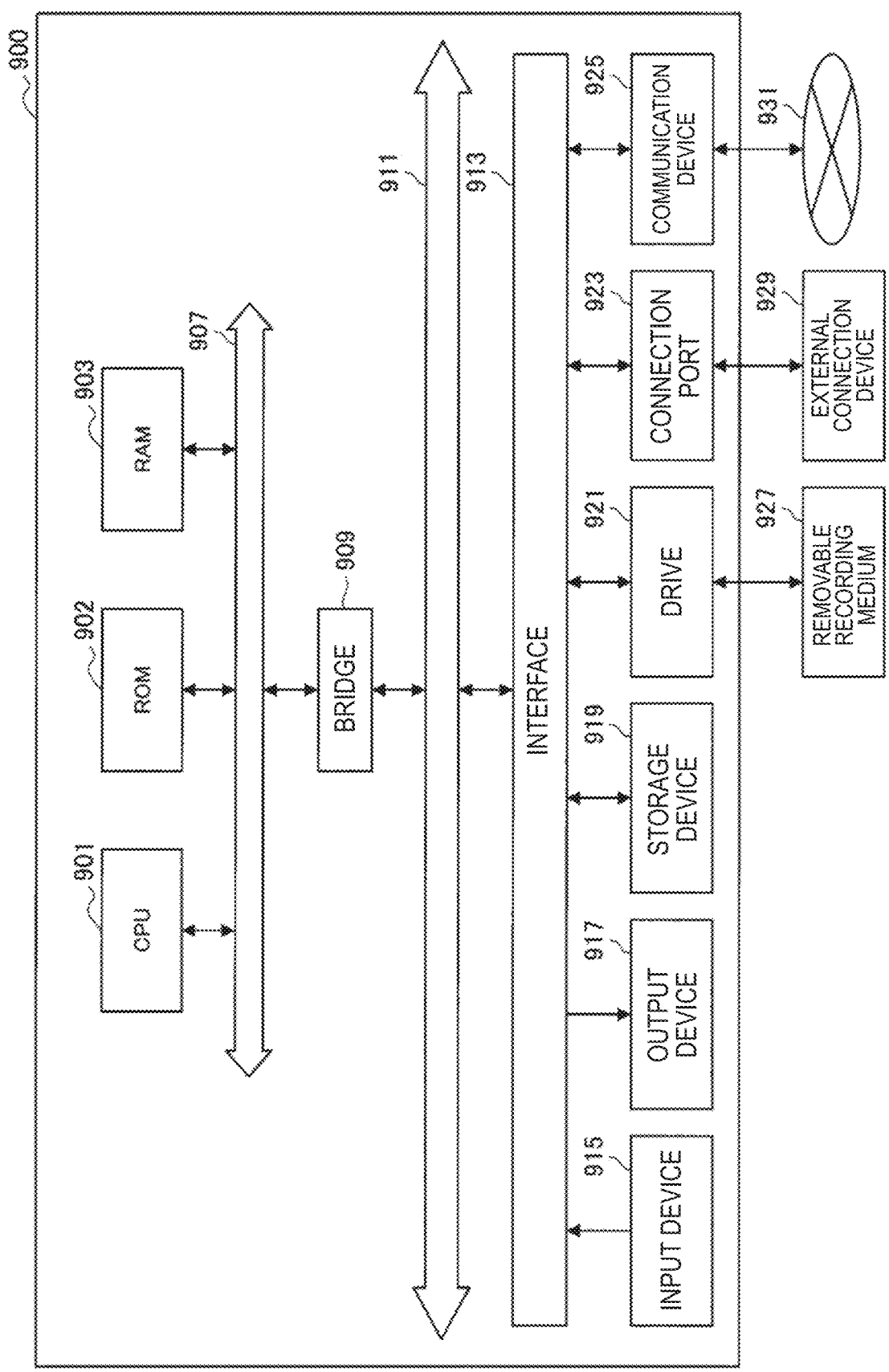
FIG. 13 is a function block diagram illustrating an example configuration of a hardware configuration of an information processing device included in the information processing system according to the embodiment.

Next, like the above-described information processing devices 10 and 20, the output device 30, and the imaging device 40, a hardware configuration of an information processing device 900 included in the information processing system 1 according to the present embodiment will be described in detail with reference to FIG. 13. FIG. 13 is a function block diagram illustrating an example configuration of the hardware configuration of the information processing device 900 included in the information processing system 1 according to the present embodiment of the present disclosure.

The information processing device 900 included in the information processing system 1 according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the recognition unit 103, the image combination unit 105, the analysis unit 203, the display control unit 205, and the force sense control unit 207 described above with reference to FIG. 6 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal. Note that the display unit 31 described above with reference to FIG. 6 can be realized by, for example, the output device 917.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like. Note that the communication units 101 and 201 described with reference to FIG. 6 can be realized by, for example, the communication device 925.

Heretofore, an example of the hardware configuration capable of realizing the functions of the information processing device 900 included in the information processing system 1 according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 13, for example, it naturally includes various configurations corresponding to the information processing device 900 included in the information processing system 1 according to the present embodiment.

Note that it is also possible to develop a computer program for realizing the respective functions of the information processing device 900 included in the information processing system 1 according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (for example, a plurality of servers or the like). Note that a single computer or a plurality of cooperating computers is also referred to as "computer system."

6. CONCLUSION

As described above, in the information processing system 1 according to the embodiment, the information processing device 20 acquires information indicating acceleration directly or indirectly detected in accordance with a change in a motion of a viewpoint for presenting a video in a situation in which the video is presented to the user Ub. Then, the information processing device 20 controls an operation of the sensation introduction unit 35 that presents a force sense to a predetermined part (for example, the head) of a user on the basis of the information indicating the acceleration. In this configuration, since acceleration is applied to the predetermined part of the user so that the acceleration is interlocked with the video presented to the user, it is possible to alleviate motion sickness occurring in association with watching of the video.

Note that the example in which the acceleration is applied to the head of the user has been mainly described above, but the part to which the acceleration is applied is not necessarily limited to the head as long as a sense of body of the user can be stimulated so that the sense of body is interlocked with a video presented to a user. In addition, the video presented to the user is not necessarily limited to an omni-directional video as long as a force sense can be presented so that the force sense is interlocked with a video presented to a user. For example, a video based on a viewpoint (visual field) similar to the user Ua wearing the imaging device 40 may be presented to the user Ub wearing the output device 30. In this case, a force sense may be presented to the user Ub in accordance with a change in a position or an orientation of the viewpoint of the user Ua.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a control unit configured to control an operation of a sensation presenting unit that presents a mechanical stimulation or an electric stimulation to a head or a neck of a first user on a basis of information regarding a change in a presentation video presented to the first user via a display unit.

(2)

The information processing device according to (1), in which the information regarding the change in the presentation video includes information regarding a movement of a viewpoint for generating the presentation video.

(3)

The information processing device according to (2), in which the information regarding the change in the presentation video includes acceleration information indicating acceleration directly or indirectly detected in accordance with the movement of the viewpoint.

(4)

The information processing device according to (3), in which the presentation video is generated through imaging by an imaging unit provided in an external device held by a second user different from the first user, and the control unit controls the operation of the sensation presenting unit on a basis of the acceleration information.

(5)

The information processing device according to (4), in which the acceleration information is generated on a basis of a detection result of an acceleration sensor installed in the external device.

(6)

The information processing device according to (4), in which the acceleration information is obtained by analyzing a video generated through imaging of the imaging unit.

(7)

The information processing device according to (4), in which the presentation video includes a video to be presented on a basis of information in accordance with a detection result of at least one of a position and an attitude of a viewpoint of the first user.

(8)

The information processing device according to (7), in which the control unit controls the operation of the sensation presenting unit such that the mechanical stimulation or the electric stimulation is presented to the head or the neck on a basis of at least one of the position and the attitude of the viewpoint of the first user and at least one of a position and an attitude of the viewpoint of the second user.

(9)

The information processing device according to (8), in which the control unit controls a direction in which the mechanical stimulation or the electric stimulation is presented to the head or the neck on a basis of a relative change in at least one of the position and the attitude of the viewpoint of the second user with respect to at least one of the position and the attitude of the viewpoint of the first user.

(10)

The information processing device according to any one of (4) to (9), including:

a communication unit configured to transmit information indicating a detection result of at least one of the position and the attitude of the viewpoint of the first user to the external device.

(11)

The information processing device according to (3), in which the viewpoint is a viewpoint set in a virtual space to present a video in the virtual space as the presentation video to the first user.

(12)

The information processing device according to (11), in which the control unit controls an operation of the sensation presenting unit on a basis of a change in the acceleration in accordance with a virtual change in the viewpoint in the virtual space.

(13)

The information processing device according to (12), in which the control unit controls the operation of the sensation presenting unit on the basis of the change in the acceleration in accordance with the virtual change in the viewpoint based on a change in a magnification ratio at which the video in the virtual space is presented.

(14)

The information processing device according to any one of (1) to (13), in which the display unit is supported to have a predetermined positional relation with the head of the first user, the presentation video is displayed on the display unit in accordance with a detection result by a detection unit that detects a change in at least one of a position or an orientation of a viewpoint of the first user, and the control unit controls the operation of the sensation presenting unit so that the presentation video displayed on the display unit is interlocked with the mechanical stimulation or the electric stimulation.

(15)

An information processing method including: by a computer system, controlling an operation of a sensation presenting unit that presents a mechanical stimulation or an electric stimulation to a head or a neck of a first user on a basis of information regarding a change in a presentation video presented to the first user via a display unit.

(16)

A program causing a computer system to control an operation of a sensation presenting unit that presents a mechanical stimulation or an electric stimulation to a head or a neck of a first user on a basis of information regarding a change in a presentation video presented to the first user via a display unit.

REFERENCE SIGNS LIST 1 information processing system
10 information processing device
101 communication unit
103 recognition unit
105 image combination unit
20 information processing device
201 communication unit
203 analysis unit
205 display control unit
207 force sense control unit
30 output device
31 display unit
33 detection unit
35 sensation introduction unit
40 imaging device
41a, 41b imaging unit
43 detection unit
80 content server
85 storage unit

The invention claimed is:

1. An information processing device comprising:
a control unit configured to control an operation of a sensation presenting unit configured to present a mechanical stimulation or an electric stimulation to a head or a neck of a first user on a basis of information regarding a change in a presentation video presented to the first user via a display,
wherein the information regarding the change in the presentation video includes acceleration information indicating acceleration detected in accordance with a movement of a viewpoint of an imaging unit of an external device configured to generate the presentation video,
wherein the presentation video is generated through imaging by the imaging unit provided in the external device worn or held by a second user different from the first user,
wherein the control unit controls the operation of the sensation presenting unit on a basis of the acceleration information related to the external device, and
wherein the control unit is implemented via at least one processor.

2. The information processing device according to claim 1, wherein the acceleration information is generated on a basis of a detection result of an acceleration sensor installed in the external device.

3. The information processing device according to claim 1, wherein the acceleration information is obtained by analyzing a video generated through imaging of the imaging unit.

4. The information processing device according to claim 1, wherein the presentation video includes a video to be presented on a basis of information in accordance with a detection result of at least one of a position and an attitude of a viewpoint of the first user.

5. The information processing device according to claim 4, wherein the control unit controls the operation of the sensation presenting unit such that the mechanical stimulation or the electric stimulation is presented to the head or the neck on a basis of at least one of the position and the attitude of the viewpoint of the first user and at least one of a position and an attitude of the viewpoint of the second user.

6. The information processing device according to claim 5, wherein the control unit controls a direction in which the mechanical stimulation or the electric stimulation is presented to the head or the neck on a basis of a relative change in at least one of the position and the attitude of the viewpoint of the second user with respect to at least one of the position and the attitude of the viewpoint of the first user.

7. The information processing device according to claim 1, further comprising:
a communication unit configured to transmit information indicating a detection result of at least one of a position and an attitude of the viewpoint of the first user to the external device,
wherein the communication unit is implemented via at least one processor.

8. The information processing device according to claim 1, wherein the viewpoint is set in a virtual space to present a video in the virtual space as the presentation video to the first user.

9. The information processing device according to claim 8, wherein the control unit controls an operation of the sensation presenting unit on a basis of a change in the acceleration in accordance with a virtual change in the viewpoint in the virtual space.

10. The information processing device according to claim 9, wherein the control unit controls the operation of the sensation presenting unit on the basis of the change in the acceleration in accordance with the virtual change in the viewpoint based on a change in a magnification ratio at which the video in the virtual space is presented.

11. The information processing device according to claim 1,
wherein the display is supported to have a predetermined positional relation with the head of the first user,
the presentation video is displayed on the display in accordance with a detection result by a detection unit that detects a change in at least one of a position or an orientation of a viewpoint of the first user, and
the control unit controls the operation of the sensation presenting unit so that the presentation video displayed on the display is interlocked with the mechanical stimulation or the electric stimulation.

12. The information processing device according to claim 1,
wherein the sensation presenting unit further presents the mechanical stimulation or the electrical stimulation on a basis of a recognized behavior of the first user.

13. An information processing method comprising:
controlling, by a computer system, an operation of a sensation presenting unit configured to present a mechanical stimulation or an electric stimulation to a head or a neck of a first user on a basis of information regarding a change in a presentation video presented to the first user via a display,
wherein the information regarding the change in the presentation video includes acceleration information indicating acceleration detected in accordance with a movement of a viewpoint of an imaging unit of an external device configured to generate the presentation video, wherein the presentation video is generated through imaging by the imaging unit provided in the external device worn or held by a second user different from the first user, and wherein the operation of the sensation presenting unit is controlled on a basis of the acceleration information related to the external device.

14. A non-transitory computer-readable storage medium having embodied thereon a program, which when executed by a computer system causes the computer system to execute a method, the method comprising:

controlling an operation of a sensation presenting unit configured to present a mechanical stimulation or an electric stimulation to a head or a neck of a first user on a basis of information regarding a change in a presentation video presented to the first user via a display, wherein the information regarding the change in the presentation video includes acceleration information indicating acceleration detected in accordance with a movement of a viewpoint of an imaging unit of an external device configured to generate the presentation video, wherein the presentation video is generated through imaging by the imaging unit provided in the external device worn or held by a second user different from the first user, and wherein the operation of the sensation presenting unit is controlled on a basis of the acceleration information related to the external device.

* * * * *